(12) United States Patent
Ohno

(10) Patent No.: US 9,840,300 B2
(45) Date of Patent: Dec. 12, 2017

(54) VEHICLE

(71) Applicant: YAMAHA HATSUDOKI KABUSHIKI KAISHA, Iwata-shi, Shizuoka (JP)

(72) Inventor: Kohsuke Ohno, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 0 days.

(21) Appl. No.: 15/279,691

(22) Filed: Sep. 29, 2016

(65) Prior Publication Data

US 2017/0088216 A1    Mar. 30, 2017

(30) Foreign Application Priority Data

Sep. 30, 2015   (JP) ................................. 2015-194216

(51) Int. Cl.
| | |
|---|---|
| *B62K 5/10* | (2013.01) |
| *B60G 17/015* | (2006.01) |
| *B60G 17/016* | (2006.01) |
| *B60G 17/019* | (2006.01) |
| *B62K 5/05* | (2013.01) |

(Continued)

(52) U.S. Cl.
CPC ............ *B62K 5/10* (2013.01); *B60G 17/0155* (2013.01); *B60G 17/0162* (2013.01); *B60G 17/01933* (2013.01); *B62K 5/027* (2013.01); *B62K 5/05* (2013.01); *B62K 5/08* (2013.01); *B60G 2300/122* (2013.01); *B60G 2400/208* (2013.01); *B62J 2099/002* (2013.01); *B62J 2099/0046* (2013.01); *B62K 2005/001* (2013.01)

(58) Field of Classification Search
CPC combination set(s) only.
See application file for complete search history.

(56) References Cited

U.S. PATENT DOCUMENTS 5,092,421 A     3/1992   Tsurumaki et al.
6,492,805 B1 *  12/2002  Wakabayashi .......... B60T 1/065
                                                      324/160

(Continued)

FOREIGN PATENT DOCUMENTS

EP    1 918 187 A1   5/2008
EP    2 557 004 A2   2/2013

(Continued)

OTHER PUBLICATIONS

Official Communication issued in corresponding European Patent Application No. 16191890.9, dated Jun. 7, 2017.

*Primary Examiner* — Nicole T Verley
(74) *Attorney, Agent, or Firm* — Keating and Bennett, LLP

(57) ABSTRACT

A vehicle includes an inverted suspension and a wheel speed sensor and a sensor wire. At least a portion of a left wheel speed sensor is disposed inwards of an outer edge of a left front inner tube, and at least a portion thereof is provided between a left front imaginary line and a left rear imaginary line when seen from the direction of the left wheel axis and disposed above a lower end of a left shock absorber. A left sensor wire crosses the left front imaginary line or the left rear imaginary line below either of a lower end of a left front outer tube and a lower end of a left rear outer tube. At least a portion of a left lower restrictor is provided on a left inner connector in a position located ahead of the left front imaginary line or behind the left rear imaginary line.

14 Claims, 15 Drawing Sheets

(51) Int. Cl.
  *B62K 5/027*  (2013.01)
  *B62K 5/08*  (2006.01)
  *B62K 5/00*  (2013.01)
  *B62J 99/00*  (2009.01)

(56) References Cited

U.S. PATENT DOCUMENTS

| | | | | |
|---|---|---|---|---|
| 7,661,771 | B2* | 2/2010 | Nimura | B60T 8/1706 |
| | | | | 180/219 |
| 7,901,013 | B2* | 3/2011 | Ishida | B60T 8/171 |
| | | | | 303/137 |
| 8,262,111 | B2* | 9/2012 | Lucas | B60G 3/20 |
| | | | | 180/210 |
| 8,814,186 | B1* | 8/2014 | Rinda | B62K 5/06 |
| | | | | 280/124.135 |
| 9,517,807 | B2* | 12/2016 | Takano | B60G 3/01 |
| 9,539,857 | B2* | 1/2017 | Sagane | B60B 27/0068 |
| 9,604,687 | B2* | 3/2017 | Asano | B60G 21/05 |
| 9,688,339 | B2* | 6/2017 | Hirayama | B62K 5/10 |
| 9,725,130 | B2* | 8/2017 | Takano | B62K 25/08 |
| 9,744,952 | B2* | 8/2017 | Seto | B60T 8/1706 |
| 2003/0019677 | A1* | 1/2003 | Wotton | G01C 22/02 |
| | | | | 180/219 |
| 2005/0167174 | A1* | 8/2005 | Marcacci | B60G 17/0152 |
| | | | | 180/76 |
| 2005/0247499 | A1* | 11/2005 | Toyoda | B62J 99/00 |
| | | | | 180/219 |
| 2008/0110706 | A1 | 5/2008 | Ishida | |
| 2008/0115994 | A1 | 5/2008 | Martini et al. | |
| 2009/0108555 | A1* | 4/2009 | Wilcox | B60G 7/008 |
| | | | | 280/93.51 |
| 2013/0026731 | A1 | 1/2013 | Mikura et al. | |
| 2013/0168944 | A1* | 7/2013 | Bartolozzi | B60G 3/01 |
| | | | | 280/269 |
| 2015/0232147 | A1* | 8/2015 | Hirayama | B62K 21/20 |
| | | | | 280/267 |
| 2015/0321721 | A1* | 11/2015 | Sasaki | B62K 5/05 |
| | | | | 180/210 |
| 2016/0107713 | A1* | 4/2016 | Takano | B62K 5/027 |
| | | | | 180/210 |
| 2016/0121958 | A1 | 5/2016 | Asano | |
| 2016/0144923 | A1* | 5/2016 | Asano | B62K 5/05 |
| | | | | 280/124.103 |
| 2016/0152278 | A1* | 6/2016 | Kawashiri | B60Q 1/0035 |
| | | | | 180/89.1 |
| 2016/0152293 | A1* | 6/2016 | Hirayama | B62K 5/05 |
| | | | | 280/124.103 |
| 2016/0185413 | A1* | 6/2016 | Takano | B62K 21/00 |
| | | | | 280/124.103 |
| 2016/0244118 | A1* | 8/2016 | Tanabe | B62J 23/00 |
| 2016/0280193 | A1* | 9/2016 | Seto | B60T 8/1706 |
| 2017/0088217 | A1* | 3/2017 | Ohno | B60G 17/0155 |

FOREIGN PATENT DOCUMENTS

| | | | | |
|---|---|---|---|---|
| EP | 2130731 B1 * | 7/2015 | ............ | B60T 8/3685 |
| EP | 3069979 A2 * | 9/2016 | ............ | B60G 13/003 |
| GB | 2 268 556 A | 1/1994 | | |
| WO | 2012/007819 A1 | 1/2012 | | |
| WO | 2015/002162 A1 | 1/2015 | | |
| WO | 2015/002163 A1 | 1/2015 | | |

\* cited by examiner

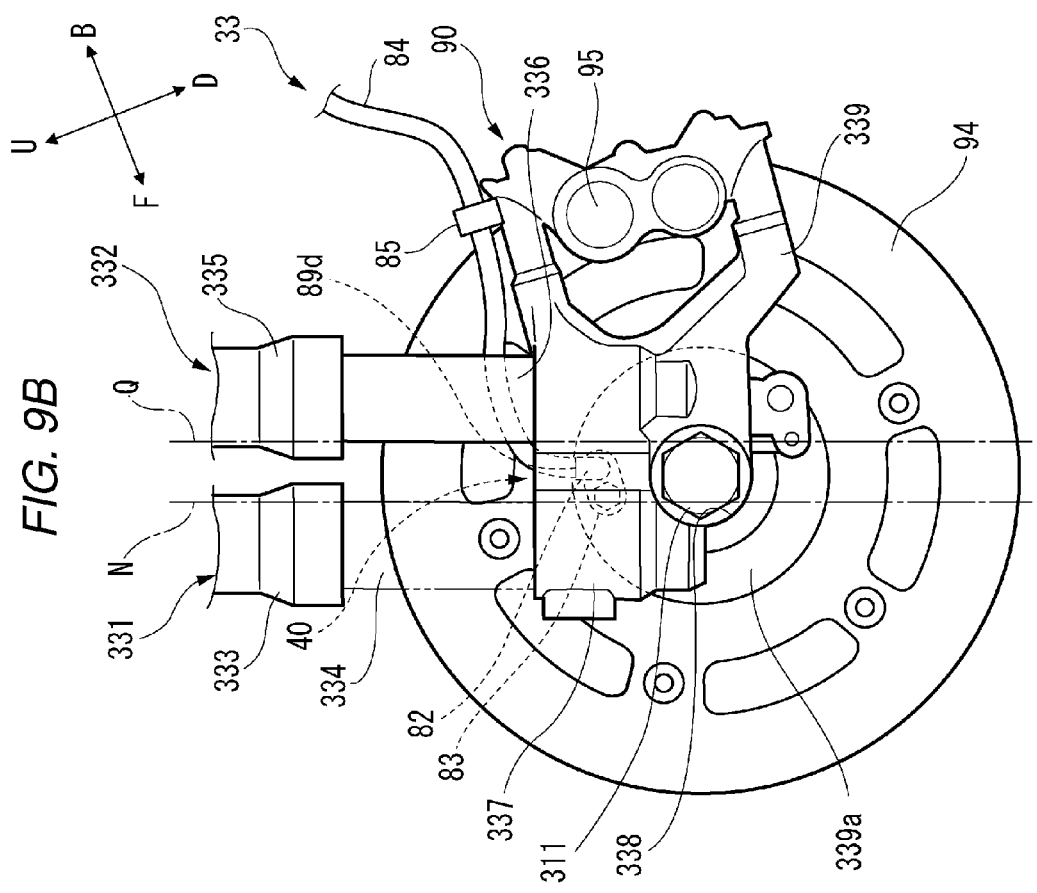
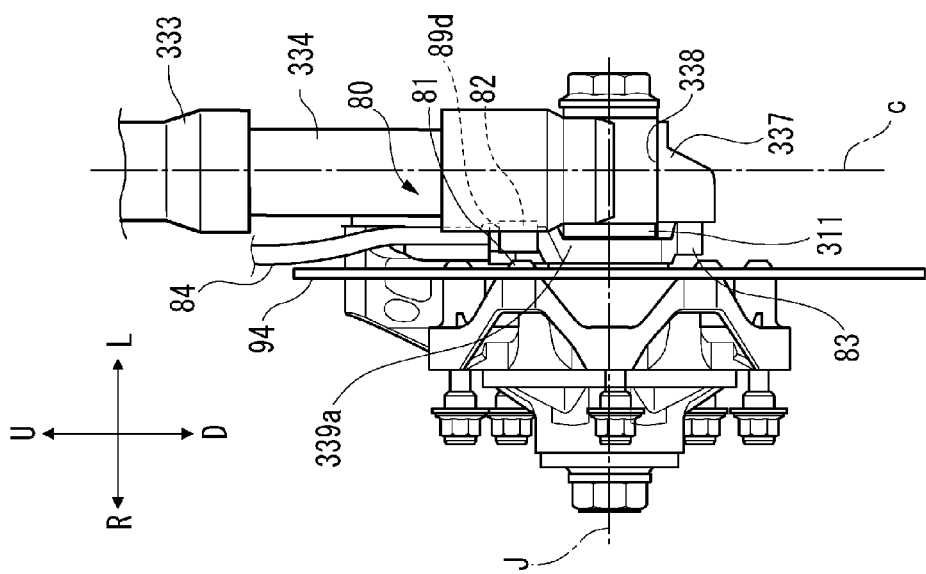

VEHICLE

BACKGROUND OF THE INVENTION

1. Field of the Invention

The present invention relates to a vehicle including a body frame that is able to lean and two front wheels that are aligned side by side in a left-and-right direction.

2. Description of the Related Art

A vehicle including a body frame that is able to lean and two front wheels that are aligned side by side in the left-and-right direction is well known through International Patent Publication No. 2015/002163 or the like. In general, the vehicle including the body frame that is able to lean and the two front wheels that are aligned side by side in the left-and-right direction turns with the body frame inclined or caused to lean relative to a vertical direction. More specifically, the body frame leans to the right of the vehicle when the vehicle turns right, whereas when the vehicle turns left, the body frame leans to the left of the vehicle.

The vehicle described in International Patent Publication No. 2015/002163 includes a linkage that supports the two front wheels so as to be displaced in up-and-down direction of the body frame relative to the body frame and shock absorbers that support the two front wheels so as to be displaced in the up-and-down direction of the body frame relative to the linkage to absorb shocks from a road surface.

The vehicle described in International Patent Publication No. 2015/002163 uses a so-called upright suspension as the shock absorber. The upright suspension includes an outer tube that supports a wheel rotatably at a lower portion and an inner tube that is inserted into the outer tube at a lower portion and which is supported on the linkage at an upper portion thereof. The upright suspension attenuates the displacement of the front wheel in the up-and-down direction relative to the linkage and the body frame by allowing the outer tube and the inner tube to extend and contract along an extending and contracting axis thereof. The vehicle described in International Patent Publication No. 2015/002163 includes a wheel speed sensor that detects a rotation speed of the front wheel. This wheel speed sensor is protected by a cover member that is provided on the wheel.

SUMMARY OF THE INVENTION

The inventor of the present invention has studied a vehicle on which not an upright suspension like the one described above but an inverted suspension is mounted. The inventor has discovered as a result of the study of the vehicle on which the inverted suspension is mounted that a vehicle including a preferred layout of a wheel speed sensor and a preferred layout of a sensor wire that extends from a wheel speed sensor differs from the vehicle described in International Patent Publication No. 2015/002163.

Preferred embodiments of the present invention provide a vehicle that includes an inverted suspension and which includes a preferred layout of a wheel speed sensor and a sensor wire.

According to a preferred embodiment of the present invention, a vehicle includes a body frame that is able to lean to the right of the vehicle when the vehicle turns right and lean to the left of the vehicle when the vehicle turns left; a right front wheel that rotates about a right wheel axis; a left front wheel provided on the left of the right front wheel in relation to a left-and-right direction of the body frame and which rotates about a left wheel axis; a right shock absorber that supports the right front wheel at a lower portion thereof so as to enable the right front wheel to be displaced relatively upwards; a left shock absorber that supports the left front wheel at a lower portion thereof so as to enable the left front wheel to be displaced relatively upwards; and a linkage provided on the body frame so as to turn and which supports an upper portion of the right shock absorber at a right portion and supports an upper portion of the left shock absorber at a left portion thereof so as to enable the right front wheel and the left front wheel to be displaced relatively in relation to the up-and-down direction of the body frame, wherein the right shock absorber includes a right front telescopic element including a right front outer tube that extends in the direction of a right extending and contracting axis that extends in the up-and-down direction of the body frame and a right front inner tube that is inserted into the right front outer tube and which extends in the direction of the right extending and contracting axis so that a lower end portion thereof is provided below a lower end portion of the right front outer tube; a right rear telescopic element including a right rear outer tube that is provided behind the right front outer tube in relation to a front-and-rear direction of the body frame and which extends in the direction of the right extending and contracting axis and a right rear inner tube that is inserted into the right rear outer tube and which extends in the direction of the right extending and contracting axis so that a lower end portion thereof is provided below a lower end portion of the right rear outer tube; and a right inner connector that connects a lower portion of the right front inner tube and a lower portion of the right rear inner tube together, the left shock absorber includes a left front telescopic element including a left front outer tube that extends in the direction of a left extending and contracting axis that extends in the up-and-down direction of the body frame and a left front inner tube that is inserted into the left front outer tube and which extends in the direction of the left extending and contracting axis so that a lower end portion thereof is provided below a lower end portion of the left front outer tube; a left rear telescopic element including a left rear outer tube that is provided behind the left front outer tube in relation to the front-and-rear direction of the body frame and which extends in the direction of the left extending and contracting axis and a left rear inner tube that is inserted into the left rear outer tube and which extends in the direction of the left extending and contracting axis so that a lower end portion thereof is provided below a lower end portion of the left rear outer tube; and a left inner connector that connects a lower portion of the left front inner tube and a lower portion of the left rear inner tube together, at least one of a condition (A) and a condition (B) is satisfied: condition (A) includes a structure that the vehicle includes a right wheel speed sensor including a right wheel speed detector that detects a wheel speed of the right front wheel and a right sensor housing that holds the right wheel speed detector; and a right lower restrictor that restricts or prevents the deformation of a right sensor wire that extends from the right wheel speed sensor to an ECU (Engine Control Unit) that is provided on the body frame so that the right sensor wire is prevented from coming into contact with at least the right front outer tube and the right rear outer tube when the right shock absorber is operated, a structure that the right wheel speed sensor is such that when looking from the front of the vehicle and the vehicle is standing upright and not steered at all, at least a portion of the right wheel speed sensor is disposed closer to the right front wheel than an outer edge of a side of the right front inner tube which is located opposite to the right front wheel in relation to the direction of the right wheel axis and that when looking at the vehicle from the direction of the right wheel axis, at least a portion of the right wheel speed sensor is provided between a right front imaginary line that extends along a rear edge of the right front inner tube and a right rear imaginary line that extends along a front edge of the right rear inner tube and is disposed above a lower end of the right shock absorber in relation to an up-and-down direction of the right extending and contacting axis when looking at the vehicle from the direction of the right wheel axis, a structure that the right sensor wire extends across the right front imaginary line or the right rear imaginary line below either of a lower end of the right front outer tube and a lower end of the right rear outer tube which is located lower than the other of the lower end of the right front outer tube and the lower end of the right rear outer tube when the right shock absorber extends to its maximum extent, and a structure that, when looking at the vehicle from the direction of the right wheel axis, at least a portion of the right lower restrictor is provided on the right inner connector or a member that is not displaced relative to the right inner connector in a position that is located ahead of the right front imaginary line in relation to the front-and-rear direction of the body frame or a position that is located rearward of the right rear imaginary line in relation to the front-and-rear direction of the body frame; condition (B) includes a structure that the vehicle includes a left wheel speed sensor including a left wheel speed detector that detects a wheel speed of the left front wheel and a left sensor housing that holds the left wheel speed detector; and a left lower restrictor that restricts or prevents deformation of a left sensor wire that extends from the left wheel speed sensor to the ECU (Engine Control Unit) so that the left sensor wire is prevented from coming into contact with at least the left front outer tube and the left rear outer tube when the left shock absorber is operated, a structure that the left wheel speed sensor is such that, when looking at the vehicle from the front and the vehicle is standing upright and not steered at all, at least a portion of the left wheel speed sensor is disposed closer to the left front wheel than an outer edge of a side of the left front inner tube which is located opposite to the left front wheel in relation to the direction of the left wheel axis and that when looking at the vehicle from the direction of the left wheel axis, at least a portion of the left wheel speed sensor is provided between a left front imaginary line that extends along a rear edge of the left front inner tube and a left rear imaginary line that extends along a front edge of the left rear inner tube and is disposed above a lower end of the left shock absorber in relation to an up-and-down direction of the left extending and contacting axis when looking at the vehicle from the direction of the left wheel axis, a structure that the left sensor wire crosses the left front imaginary line or the left rear imaginary line below either of a lower end of the left front outer tube and a lower end of the left rear outer tube which is located lower than the other of the lower end of the left front outer tube and the lower end of the left rear outer tube when the left shock absorber extends to its maximum extent, and a structure that, when looking at the vehicle from the direction of the left wheel axis, at least a portion of the left lower restrictor is provided on the left inner connector or a member that is not displaced relative to the left inner connector in a position that is located ahead of the left front imaginary line in relation to the front-and-rear direction of the body frame or a position that is located behind the left rear imaginary line in relation to the front-and-rear direction of the body frame.

According to a preferred embodiment of the present invention, the condition (A) provides the following advantageous effects.

In the right wheel speed sensor, when looking at the front of the vehicle and the vehicle is standing upright and not steered at all, at least a portion of the right wheel speed sensor is provided closer to the right front wheel than the outer edge of the side of the right front inner tube that is located opposite to the right front wheel in relation to the direction of the right wheel axis. Namely, the right front inner tube protects at least a portion of the right wheel speed sensor from stones, mud, water and the like which come flying from the front of the vehicle.

At least a portion of the right wheel speed sensor is provided on the right inner connector between the right front imaginary line extending along the rear edge of the right front inner tube and the right rear imaginary line extending along the front edge of the right rear inner tube when looking at the vehicle from the direction of the right wheel axis. In addition, the right wheel speed sensor is disposed above the lower end of the right shock absorber when looking at the vehicle from the direction of the right wheel axis.

At least a portion of the right wheel speed sensor is held by the right front inner tube and the right rear inner tube therebetween in relation to the front-and-rear direction when looking at the vehicle from the direction of the right wheel axis. Therefore, the right wheel speed sensor is protected from stones, mud and water that are splashed thereon from the front. In addition, the right wheel speed sensor is also protected from stones, mud and water that are splashed thereon from below by the right shock absorber.

The right sensor wire crosses the front imaginary line or the rear imaginary line below the lower end of the right front outer tube or the lower end of the right rear outer tube in such a state that the right front outer tube and the right rear outer tube extend to their maximum extent. Thus, there are concerns that the right sensor wire interferes with the right front outer tube and the right rear outer tube when the right shock absorber is compressed to its maximum extent. However, according to a vehicle that satisfies condition (A), the interference is significantly reduced or prevented for the following reasons.

Both the right wheel speed sensor and the right lower restrictor are provided on the right inner connector or the member that is displaced relatively together with the right inner connector when the right shock absorber is operated. Due to this, even though the right shock absorber operates, a portion of the right sensor wire between the right wheel speed sensor and the right lower restrictor is prevented from being deformed.

According to a vehicle that satisfies the condition (A), the right lower restrictor is provided ahead of the right front imaginary line or behind the right rear imaginary line. Namely, the portion of the right sensor wire that crosses the right front imaginary line or the right rear imaginary line corresponds to the portion that extends from the right wheel speed sensor to the right lower restrictor and which is prevented from being deformed. Due to this, even though the right shock absorber operates, it becomes difficult for the right sensor wire to interfere with the right front outer tube or the right rear outer tube. Consequently, the right sensor wire is laid out even in an area where interference would appear to easily occur, thus the degree of freedom in laying out the right sensor wire is enhanced.

According to a vehicle that satisfies the condition (B), in relation to the left sensor wire, similar advantageous effects to that described above are obtained. In the following descriptions, the right wheel speed sensor and the right sensor wire described satisfying condition (A) are symmetrical laterally with the left wheel speed sensor and the left sensor wire. Therefore, in relation to advantageous effects of the configurations below, only those of the right wheel speed sensor and the right sensor wire satisfying condition (A) will be described, and the description of advantageous effects of the left wheel speed sensor and the left sensor wire satisfying condition (B) will be omitted.

According to a preferred embodiment of the present invention, the condition (A) preferably includes a structure that, when looking at the vehicle from the direction of the right wheel axis, the right sensor wire crosses the right front imaginary line or the right rear imaginary line below either of the lower end of the right front outer tube and the lower end of the right rear outer tube which is located lower than the other of the lower end of the right front outer tube and the lower end of the right rear outer tube when the right shock absorber is compressed to its maximum extent, and the condition (B) preferably includes a structure that, when looking at the vehicle from the direction of the left wheel axis, the left sensor wire crosses the left front imaginary line or the left rear imaginary line below either of the lower end of the left front outer tube and the lower end of the left rear outer tube which is located lower than the other of the lower end of the left front outer tube and the lower end of the left rear outer tube when the left shock absorber is compressed to its maximum extent.

According to the vehicle described above, in such a state that the right shock absorber is compressed to its maximum extent, the right front outer tube and the right rear outer tube are not displaced downwards any farther. When the right sensor wire crosses the right front imaginary line or the right rear imaginary line below either of the lower end of the right front outer tube and the lower end of the right rear outer tube which is lower than the other of the lower end of the right front outer tube and the lower end of the right rear outer tube in such a state that the right shock absorber is compressed to its maximum extent, the right sensor wire does not interfere with the right front outer tube and the right rear outer tube. The interference of the right sensor wire with the right front outer tube and the right rear outer tube is avoided easily.

According to a preferred embodiment of the present invention, the vehicle preferably includes a right brake including a right brake disc that rotates together with the right front wheel and a right brake caliper that applies a braking force to the right brake disc to apply a braking force to the right front wheel; and a left brake including a left brake disc that rotates together with the left front wheel and a left brake caliper that applies a braking force to the left brake disc to apply a braking force to the left front wheel, the condition (A) preferably includes a structure that the right inner connector includes a right axle support that rotatably supports a right axle member of the right front wheel; and a right caliper boss to which the right brake caliper is attached, and a structure that, when looking at the vehicle from the direction of the right wheel axis, the right lower restrictor is provided on the right caliper boss at least a portion of which is provided ahead of the right front inner tube, or a structure that, when looking at the vehicle from the direction of the right wheel axis, the right lower restrictor is provided on the right caliper boss at least a portion of which is provided behind the right rear inner tube, and the condition (B) preferably includes a structure that the left inner connector includes a left axle support that rotatably supports a left axle member of the left front wheel; and a left caliper boss to which the left brake caliper is attached, and a structure that, when looking at the vehicle from the direction of the left wheel axis, the left lower restrictor is provided on the left caliper boss at least a portion of which is provided ahead of the left front inner tube, or a structure that, when looking at the vehicle from the direction of the left wheel axis, the left lower restrictor is provided on the left caliper boss at least a portion of which is provided behind the left rear inner tube.

According to the vehicle described above, the right lower restrictor is strong and rigid by using the right caliper boss that is attached with high rigidity to support the right brake caliper.

According to a preferred embodiment of the present invention, the vehicle preferably includes a right brake including a right brake disc that rotates together with the right front wheel and a right brake caliper that applies a braking force to the right brake disc to apply a braking force to the right front wheel; and a left brake including a left brake disc that rotates together with the left front wheel and a left brake caliper that applies a braking force to the left brake disc to apply a braking force to the left front wheel, the condition (A) preferably includes a structure that, when looking at the vehicle from the front and the vehicle is standing upright and not steered at all, the right sensor wire passes between the right brake disc and the outer edge of the side of the right shock absorber that is located opposite to the right brake disc and then extends upwards, and the condition (B) preferably includes a structure that, when looking at the vehicle from the front and the vehicle is standing upright and not steered at all, the left sensor wire passes between the left brake disc and the outer edge of the side of the left shock absorber that is located opposite to the left brake disc and then extends upwards.

According to the vehicle described above, when looking at the vehicle from the front and the vehicle is standing upright and not steered at all, in the event that the right sensor wire overlaps the right shock absorber, the right sensor wire is protected by the right shock absorber from stones or the like that are caught and thrown thereto from the front. In addition, when looking at the vehicle from the front and the vehicle is standing upright and not steered at all, the gap defined between the right shock absorber and the right brake disc is extremely small. Due to this, it becomes difficult for stones or the like that are caught and thrown from the front to enter the gap.

Due to this, in the event that the right sensor wire is disposed between the outer edge of the right shock absorber and the right brake disc, the right sensor wire is protected from stones or the like that are caught and thrown from the front.

According to a preferred embodiment of the present invention, the condition (A) preferably includes a structure that, when looking at the vehicle from the direction of the right wheel axis, the right lower restrictor is disposed farther inwards than an outer edge of a wheel rim of the right front wheel, and the condition (B) preferably includes a structure that, when looking at the vehicle from the direction of the left wheel axis, the left lower restrictor is disposed farther inwards than an outer edge of a wheel rim of the left front wheel.

According to the vehicle described above, when looking at the vehicle from the direction of the right wheel axis, the portion of the right sensor wire extending from the right wheel speed sensor to the right lower restrictor which is prevented from being deformed is provided farther inwards than the outer edge of the wheel rim of the right front wheel. In this way, the right lower restrictor prevents the deformation of the right sensor wire near the right wheel speed sensor, such that the right sensor wire is held in a stable manner.

According to a preferred embodiment of the present invention, the vehicle preferably includes a right brake including a right brake disc that rotates together with the right front wheel and a right brake caliper that applies a braking force to the right brake disc to apply a braking force to the right front wheel; and a left brake including a left brake disc that rotates together with the left front wheel and a left brake caliper that applies a braking force to the left brake disc to apply a braking force to the left front wheel, the condition (A) preferably includes a structure that, when looking at the vehicle from the direction of the right wheel axis, the right sensor wire is restricted or prevented from being displaced by a right middle restrictor together with a right brake hose that extends upwards from the right brake caliper above a right lower imaginary line that connects a rear lower end of the right front outer tube and a front lower end of the right rear outer tube when the right shock absorber extends to its maximum extent, and the condition (B) preferably includes a structure that, when looking at the vehicle from the direction of the left wheel axis, the left sensor wire is restricted or prevented from being displaced by a left middle restrictor together with a left brake hose that extends upwards from the left brake caliper above a left lower imaginary line that connects a rear lower end of the left front outer tube and a front lower end of the left rear outer tube when the left shock absorber extends to its maximum extent.

According to the vehicle described above, the left middle restrictor restricts or prevents the deformation of the right sensor wire together with the right brake hose, and therefore, the right sensor wire is laid out using a highly rigid right brake hose. The right sensor wire and the right brake hose are preferably prevented together, thus making it possible to reduce the number of parts. A space where the right sensor wire is laid out and a space where the right brake hose is laid out do not have to be provided separately, such that the right sensor wire and the right brake hose are able to be laid out together within a small space.

According to a preferred embodiment of the present invention, the vehicle preferably includes a right brake including a right brake disc that rotates together with the right front wheel and a right brake caliper that applies a braking force to the right brake disc to apply a braking force to the right front wheel; and a left brake including a left brake disc that rotates together with the left front wheel and a left brake caliper that applies a braking force to the left brake disc to apply a braking force to the left front wheel, the condition (A) preferably includes a structure that, when looking at the vehicle from the direction of the right wheel axis, the right sensor wire is restricted or prevented from being displaced by a right middle restrictor that is provided on a right brake hose that extends upwards from the right brake caliper above a right lower imaginary line that connects a rear lower end of the right front outer tube and a front lower end of the right rear outer tube when the right shock absorber extends to its maximum extent, and the condition (B) preferably includes a structure that, when looking at the vehicle from the direction of the left wheel axis, the left sensor wire is restricted or prevented from being displaced by a left middle restrictor that is provided on a left brake hose that extends upwards from the left brake caliper above a left lower imaginary line that connects a rear lower end of the left front outer tube and a front lower end of the left rear outer tube when the left shock absorber extends to its maximum extent.

According to the vehicle described above, the right sensor wire is laid out with the right middle restrictor provided on the highly rigid right brake hose. The right sensor wire and the right brake hose are able to be restrained together, thus making it possible to reduce the number of parts. A space where the right sensor wire is laid out and a space where the right brake hose is laid out do not have to be provided separately, such that the right sensor wire and the right brake hose are able to be laid out together within a small space.

According to a preferred embodiment of the present invention, the vehicle preferably includes a right brake including a right brake disc that rotates together with the right front wheel and a right brake caliper that applies a braking force to the right brake disc to apply a braking force to the right front wheel; and a left brake including a left brake disc that rotates together with the left front wheel and a left brake caliper that applies a braking force to the left brake disc to apply a braking force to the left front wheel, the condition (A) preferably includes a structure that, when looking at the vehicle from the right wheel axis, the right lower restrictor is disposed farther inwards than an outer edge of the right brake disc, and the condition (B) preferably includes a structure that, when looking at the vehicle from the left wheel axis, the left lower restrictor is disposed farther inwards than an outer edge of the left brake disc.

According to the vehicle described above, when looking at the vehicle from the direction of the right wheel axis, the portion of the right sensor wire extending from the right wheel speed sensor to the right lower restrictor which is prevented from being deformed is provided farther inwards than an outer edge of the right brake disc of the right front wheel. In this way, the right lower restrictor prevents the deformation of the right sensor wire near the right wheel speed sensor, such that the right sensor wire is held in a stable manner.

According to a preferred embodiment of the present invention, the condition (A) preferably includes a structure that the right sensor wire is restricted or prevented from being deformed by the right lower restrictor, a right middle restrictor that is provided upstream of the right lower restrictor, and a right upper restrictor that is provided upstream of the right middle restrictor; a structure that the right middle restrictor is fixed to the right front outer tube, the right rear outer tube, or a member that is displaced together with the right front outer tube and the right rear outer tube, and a structure that the right upper restrictor is fixed to the body frame, and the condition (B) preferably includes a structure that the left sensor wire is restricted or prevented from being deformed by the left lower restrictor, a left middle restrictor that is provided upstream of the left lower restrictor, and a left upper restrictor that is provided upstream of the left middle restrictor; a structure that the left middle restrictor is fixed to the left front outer tube, the left rear outer tube, or a member that is displaced together with the left front outer tube and the left rear outer tube, and a structure that the left upper restrictor is fixed to the body frame.

According to the vehicle described above, the right sensor wire permits a change in distance between the ECU and the right wheel speed sensor which occurs in association with the operation of the right shock absorber by the portion between the right lower restrictor and the right middle restrictor being deformed. The right sensor wire permits a change in distance between the ECU and the right wheel speed sensor which occurs in association with the leaning operation of the vehicle and a change in distance between the ECU and the right wheel speed sensor which occurs in association with the steering operation of the vehicle by the portion between the right middle restrictor and the right upper restrictor being deformed. Since the right sensor wire is made to be deformed at the predetermined locations, large spaces do not have to be secured for the deformations of the portions of the right sensor wire, such that the vehicle is compact in size.

According to a preferred embodiment of the present invention, the condition (A) preferably includes a structure that, when looking at the vehicle from the direction of the right wheel axis, the right wheel speed sensor is disposed above a right axle member, and the condition (B) preferably includes a structure that, when looking at the vehicle from the direction of a left wheel axis, the left wheel speed sensor is disposed above the left axle member.

According to the vehicle described above, the right wheel speed sensor is protected from stones, mud, water and the like that are splashed thereon from below by the right axle member.

According to a preferred embodiment of the present invention, the vehicle preferably includes a right brake including a right brake disc that rotates together with the right front wheel and a right brake caliper that applies a braking force to the right brake disc to apply a braking force to the right front wheel; and a left brake including a left brake disc that rotates together with the left front wheel and a left brake caliper that applies a braking force to the left brake disc to apply a braking force to the left front wheel, the condition (A) preferably includes a structure that, when looking at the vehicle from the front thereof, the right wheel speed sensor is disposed closer to the right brake disc than a center line of the right front inner tube, and the condition (B) preferably includes a structure that, when looking at the vehicle from the front thereof, the left wheel speed sensor is disposed closer to the left brake disc than a center line of the left front inner tube.

According to the vehicle described above, it becomes difficult for stones that are caught and thrown from the front to intrude in the space between the right front inner tube and the right brake disc. This makes it easy to protect the right wheel speed sensor from stones that are caught and thrown from the front.

According to a preferred embodiment of the present invention, the vehicle preferably includes a right brake including a right brake disc that rotates together with the right front wheel and a right brake caliper that applies a braking force to the right brake disc to apply a braking force to the right front wheel; and a left brake including a left brake disc that rotates together with the left front wheel and a left brake caliper that applies a braking force to the left brake disc to apply a braking force to the left front wheel, the condition (A) preferably includes a structure that, when looking at the vehicle from the front thereof, at least a portion of the right sensor wire is disposed closer to the right brake disc than a center line of the right front inner tube, and the condition (B) preferably includes a structure that, when looking at the vehicle from the front thereof, at least a portion of the left sensor wire is disposed closer to the left brake disc than a center line of the left front inner tube.

According to the vehicle described above, it becomes difficult for stones that are caught and thrown from the front to intrude in the space between the right front inner tube and the right brake disc. This makes it easy to protect the right sensor wire from stones that are caught and thrown from the front.

According to a preferred embodiment of the present invention, the vehicle preferably includes a right brake including a right brake disc that rotates together with the right front wheel and a right brake caliper that applies a braking force to the right brake disc to apply a braking force to the right front wheel; and a left brake including a left brake disc that rotates together with the left front wheel and a left brake caliper that applies a braking force to the left brake disc to apply a braking force to the left front wheel, the condition (A) preferably includes a structure that, when looking at the vehicle from the direction of the right wheel axis, a right wire take-out port is provided on the right sensor housing of the right wheel speed sensor in a position located inwards of an outer edge of the right brake disc; and a structure that, when looking at the vehicle from the front thereof, at least a portion of the right sensor wire passes through a position located closer to the right brake disc than the right wire take-out port and then extends upwards, and the condition (B) preferably includes a structure that, when looking at the vehicle from the direction of the left wheel axis, a left wire take-out port is provided on the left sensor housing of the left wheel speed sensor in a position located inwards of an outer edge of the left brake disc; and a structure that, when looking at the vehicle from the front thereof, at least a portion of the left sensor wire passes through a position lying closer to the left brake disc than the left wire take-out port and then extends upwards.

According to the vehicle described above, in the right wheel speed sensor, the right wire take-out port is provided farther away from the right brake disc than the right wheel speed detector. In case the right sensor wire extends straight upwards from the right wire take-out port, there are concerns that the right sensor wire comes into interference with the right front outer tube or the right rear outer tube. Then, the space where to provide the right wheel speed detector on the side located closer to the right brake disc than the right wire take-out port, and therefore, the right sensor wire that extends from the right wire take-out port is able to extend upwards by passing close to the right brake disc. This prevents the interference of the right sensor wire with the right front outer tube or the right rear outer tube by using the originally existing space without enlarging the size of the vehicle.

According to a preferred embodiment of the present invention, the condition (A) preferably includes a structure that, when looking at the vehicle from the front and the vehicle is standing upright and not steered at all, at least a portion of the right wheel speed sensor overlaps the right front inner tube, and the condition (B) preferably includes a structure that, when looking at the vehicle from the front and the vehicle is standing upright and not steered at all, at least a portion of the left wheel speed sensor overlaps the left front inner tube.

According to the vehicle described above, when looking at the vehicle from the front thereof, at least a portion of the right wheel speed sensor overlaps the right front inner tube, and therefore, the vehicle is compact in size in relation to the direction of the right wheel axis.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 9A and 9B show a left shock absorber of a vehicle according to a first preferred embodiment of the present invention.

DETAILED DESCRIPTION OF THE PREFERRED EMBODIMENTS

Figure 1:
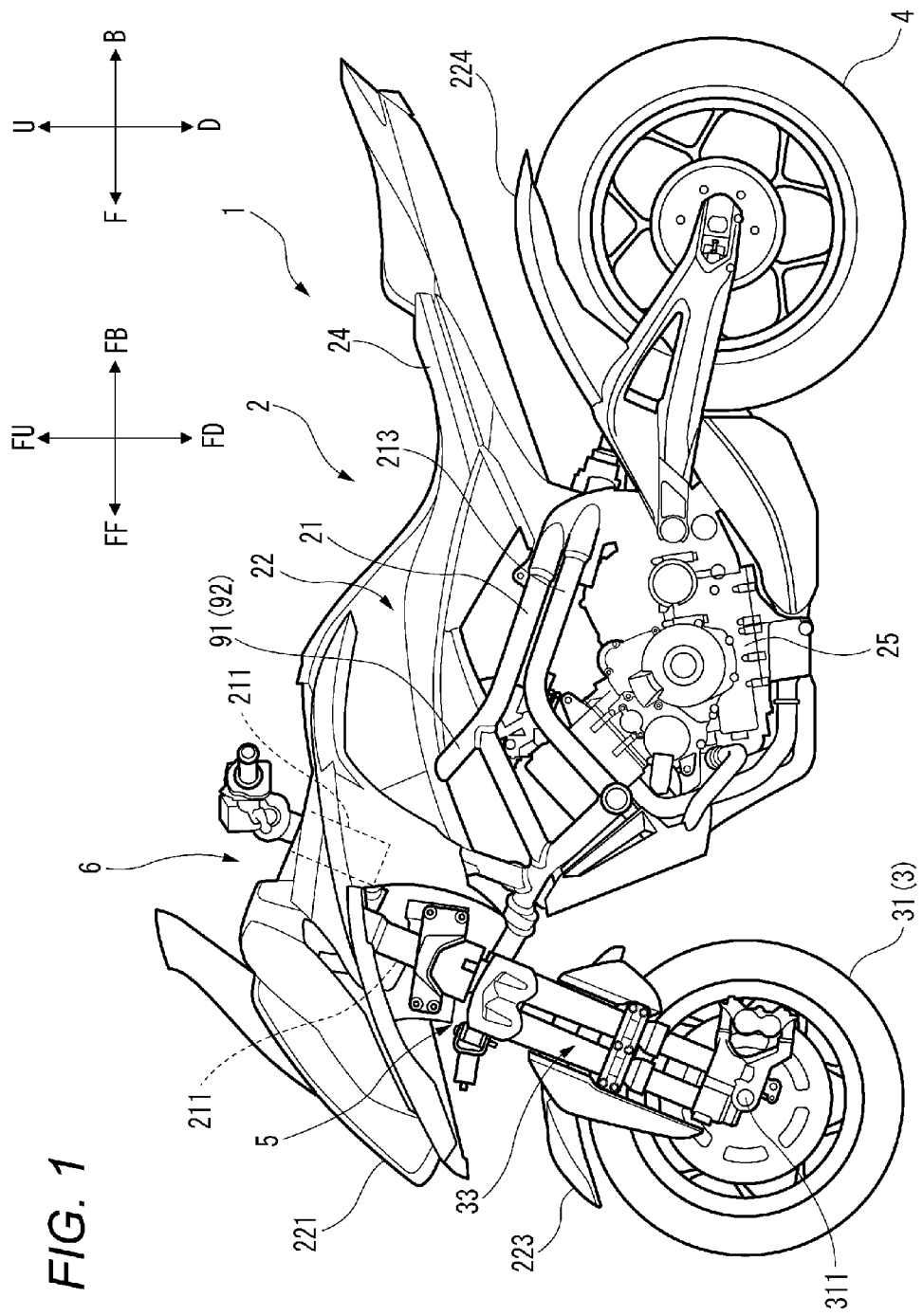
FIG. 1 is a side view showing an entire vehicle according to a preferred embodiment of the present invention as seen from a left side thereof.

Referring to the accompanying drawings, preferred embodiments of the present invention will be described in detail below.

In the accompanying drawings, an arrow F denotes a front or forward direction of a vehicle. An arrow B denotes a back/rear or backward/rearward direction of the vehicle. An arrow U denotes an up or upward direction of the vehicle. An arrow D denotes a down or downward direction of the vehicle. An arrow R denotes a right or rightward direction of the vehicle. An arrow L denotes a left or leftward direction of the vehicle.

A vehicle turns with a body frame being caused to lean to the left or right direction of the vehicle from a vertical direction. Then, in addition to the directions based on the vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-and-rear direction of the body frame," a "left-and-right direction of the body frame" and an "up-and-down direction of the body frame" mean, respectively, a front-and-rear direction, a left-and-right direction, and an up-and-down direction based on the body frame as viewed from a rider who rides the vehicle. "On or to a side of the body frame" means directly on the right or left direction of the body frame.

In this description, an expression reading "something extends in the front-and-rear direction of the body frame" includes a situation in which something extends while being inclined in relation to the front-and-rear direction of the body frame and means that something extends with a gradient which is closer to the front-and-rear direction of the body frame rather than the left-and-right direction and the up-and-down direction of the body frame.

In this description, an expression reading "something extends in the left-and-right direction of the body frame" includes a situation in which something extends while being inclined in relation to the left-and-right direction of the body frame and means that something extends with a gradient which is closer to the left-and-right direction of the body frame rather than the front-and-rear direction of the body frame and the up-and-down direction of the body frame.

In this description, an expression reading "something extends in the up-and-down direction of the body frame" includes a situation in which something extends while being inclined in relation to the up-and-down direction of the body frame and means that something extends with a gradient which is closer to the up-and-down direction of the body frame rather than the front-and-rear direction of the body frame and the left-and-right direction of the body frame.

In this description, an expression reading the "body frame stands upright or is in an upright state" means a state in which the up-and-down direction of the body frame coincides with the vertical direction in such a state that the vehicle is maintained in a non-steering state, i.e., not steered at all. In this state, the directions based on the vehicle and the directions based on the vehicle frame coincide with each other. When the vehicle is turning with the body frame caused to lean to the left or right direction from the vertical direction, the left-and-right direction of the vehicle does not coincide with the left-and-right direction of the body frame. As well, the up-and-down direction of the vehicle does not coincide with the up-and-down direction of the body frame. However, the front-and-rear direction of the vehicle coincides with the front-and-rear direction of the body frame.

In this description, "rotation or rotating" means that a member is displaced at an angle of 360 degrees or more about a center axis thereof. In this description, "turning" means that a member is displaced at an angle of less 360 degrees about a center axis thereof.

Referring to FIGS. 1 to 7, a vehicle 1 according to a preferred embodiment of the present invention will be described. The vehicle 1 is a vehicle which is driven by power generated from a power source and which includes a body frame which is able to lean and two front wheels which are aligned side by side in a left-and-right direction of the body frame.

FIG. 1 is a left side view showing the entire vehicle 1 as viewed from the left thereof. The vehicle 1 includes a vehicle main body portion 2, a pair of left and right front wheels 3, a rear wheel 4, a linkage 5, and a steering force transmission 6.

The vehicle main body portion 2 includes a body frame 21, a body cover 22, a seat 24, and an engine unit 25. In FIG. 1, the vehicle 1 is standing upright or is in an upright state. The following description, which will be made by reference to FIG. 1, is based on the premise that the vehicle 1 is standing upright or in the upright state.

The body frame 21 extends in the front-and-rear direction of the vehicle 1. The body frame 21 includes a headstock 211

(refer to FIG. 4: an example of a rear shaft support), a link support 212 (refer to FIG. 4: an example of a front shaft support), an engine support 213, a left frame 91, and a right frame 92.

The headstock 211 supports an upstream side steering shaft 60, which will be described below, so as to turn. The headstock 211 extends in an up-and-down direction of the body frame 21.

The link support 212 is provided ahead of the headstock 211 in a front-and-rear direction of the vehicle 1. The link support 212 supports the linkage 5 so as to turn.

The engine support 213 is provided rearward of the headstock 211 in the front-and-rear direction of the vehicle 1. The engine support 213 supports the engine unit 25. The engine unit 25 supports the rear wheel 4 so as to allow rotation thereof. The engine unit 25 includes a power source such as an engine, an electric motor, a battery or the like and a device such as a transmission. The power source generates a force by which the vehicle 1 is driven.

The right frame 92 is provided on the right of the left frame 91 in relation to a left-and-right direction of the vehicle. The right frame 92 and the left frame 91 preferably have a laterally symmetrical shape. The left frame 91 and the right frame 92 connect the headstock 211, the link support 212, and the engine support 213 together.

The body cover 22 includes a front cover 221, a pair of left and right front mudguards 223, and a rear mudguard 224. The body cover 22 is a structure which covers at least a portion of structural elements which are mounted on the vehicle 1 such as the pair of left and right front wheels 3, the body frame 21, the linkage 5 and the like.

The front cover 221 is disposed ahead of the seat 24. The front cover 221 covers the linkage 5 and at least a portion of the steering force transmission 6.

At least portions of the pair of left and right front mudguards 223 are individually disposed directly below the front cover 221. At least portions of the pair of left and right front mudguards 223 are disposed directly above the pair of left and right front wheels 3, respectively.

At least a portion of the rear mudguard 224 is disposed directly above the rear wheel 4.

At least portions of the pair of left and right front wheels 3 are disposed directly below the front cover 221.

At least a portion of the rear wheel 4 is disposed below the seat 24. At least a portion of the rear wheel 4 is disposed directly below the rear mudguard 224.

Figure 2:
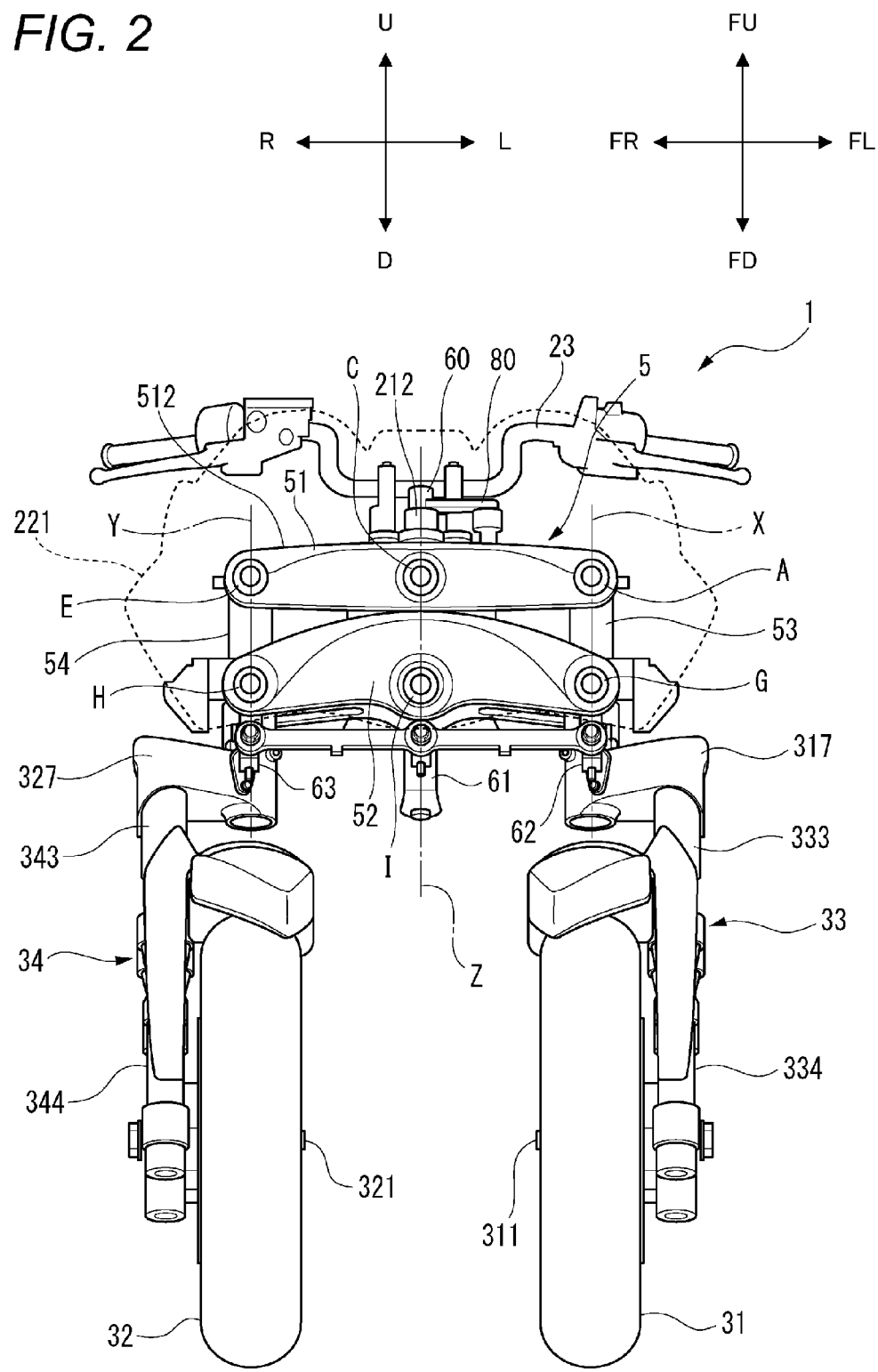
FIG. 2 is a front view showing a front portion of the vehicle shown in FIG. 1.

FIG. 2 is a front view of the front portion of the vehicle 1 as viewed from the front of the body frame 21. In FIG. 2, the vehicle 1 is standing upright or is in an upright state. The following description, which will be made by reference to FIG. 2, is based on the premise that the vehicle 1 is standing upright or in the upright state. FIG. 2 shows the front portion of the vehicle 1 as seen through the front cover 221 that is indicated by dashed lines.

The pair of left and right front wheels 3 include a left front wheel 31 and a right front wheel 32. The left front wheel 31 and the right front wheel 32 are aligned side by side in the left-and-right direction of the body frame 21. The right front wheel 32 is provided on the right of the left front wheel 31 on the body frame 21.

The vehicle 1 includes a left shock absorber 33, a right shock absorber 34, a left bracket 317, and a right bracket 327.

Figure 3:
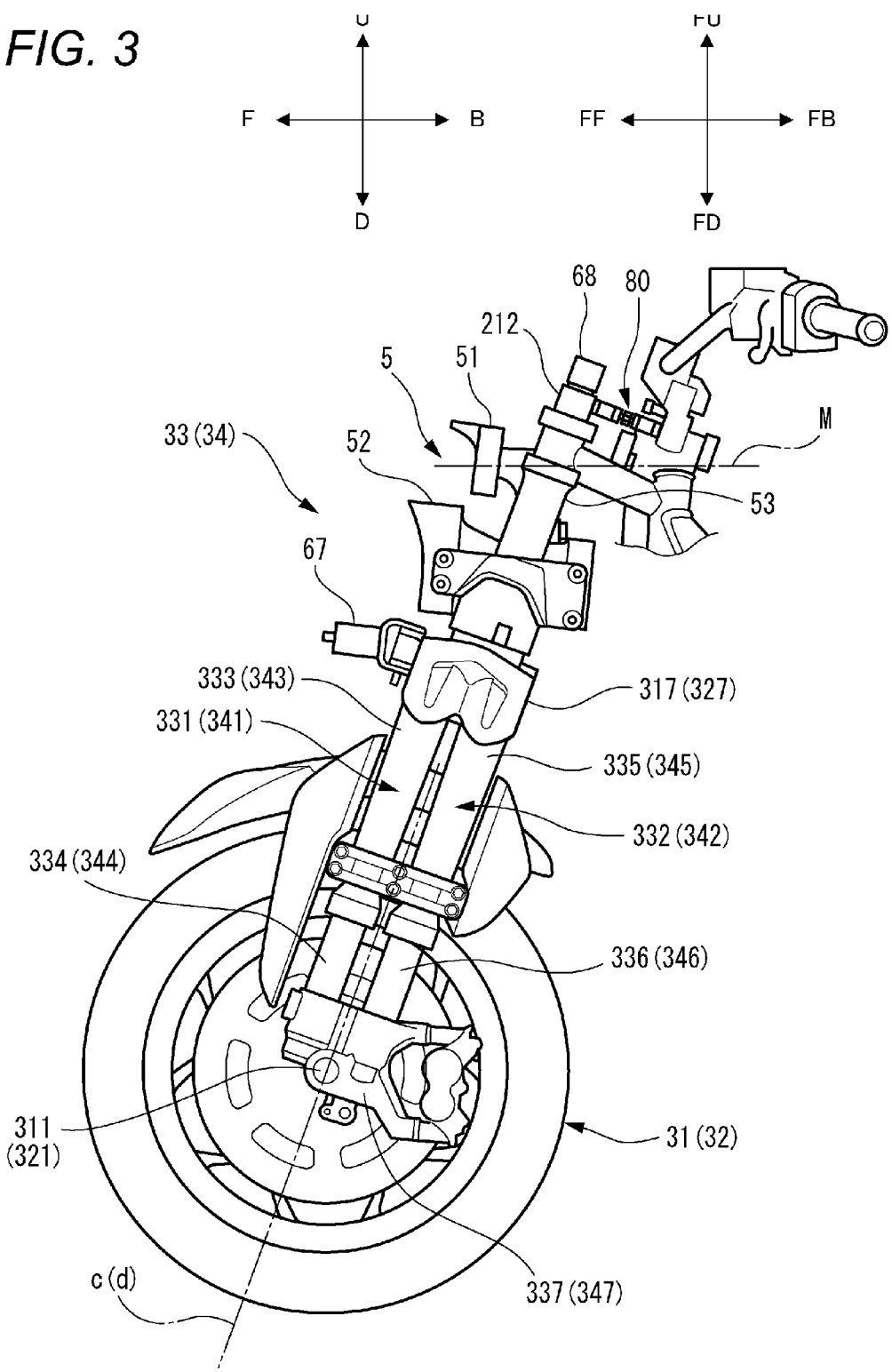
FIG. 3 is a side view showing a left shock absorber and a left front wheel.

FIG. 3 is a side view showing the left shock absorber 33 and the left front wheel 31. The right shock absorber 34 and the left shock absorber 33 are constructed laterally symmetrically with each other, and therefore, reference numerals denoting the right shock absorber 34 are also written in FIG. 3.

As shown in FIG. 3, the left shock absorber 33 is preferably a so-called telescopic shock absorber. The left shock absorber 33 includes a left front telescopic element 331, a left rear telescopic element 332, and a left inner connector 337.

The left front telescopic element 331 includes a left front outer tube 333 and a left front inner tube 334. A lower portion of the left front inner tube 334 is connected to the left inner connector 337. An upper portion of the left front inner tube 334 is inserted into the left front outer tube 333. An upper portion of the left front outer tube 333 is connected to the left bracket 317. The left front inner tube 334 is displaced relative to the left front outer tube 333 along a left extending and contracting axis c that extends in the up-and-down direction of the body frame 21. The left front telescopic element 331 extends and contracts in the direction of the left extending and contracting axis c as a result of the left front inner tube 334 being displaced relative to the left front outer tube 333 along the left extending and contracting axis c. The left extending and contracting axis c extends at an angle at which the left extending and contracting axis c is inclined slightly relative to the up-and-down direction of the body frame 21.

At least a portion of the left rear telescopic element 332 is provided behind the left front telescopic element 331. The left rear telescopic element 332 includes a left rear outer tube 335 and a left rear inner tube 336. The left rear outer tube 335 and the left front outer tube 333 are connected together so as not to move.

A lower portion of the left rear inner tube 336 is connected to the left inner connector 337. An upper portion of the left rear inner tube 336 is inserted into the left rear outer tube 335. An upper portion of the left rear outer tube 335 is connected to the left bracket 317.

The left rear inner tube 336 is displaced relative to the left rear outer tube 335 along the left extending and contracting axis c that extends in the up-and-down direction of the body frame 21. The left rear telescopic element 332 extends and contracts in the direction of the left extending and contracting axis c as a result of the left rear inner tube 336 being displaced relative to the left rear outer tube 335 along the left extending and contracting axis c.

The left inner connector 337 rotatably supports a left axle member 311 of the left front wheel 31. The left inner connector 337 connects a lower portion of the left front inner tube 334 and a lower portion of the left rear inner tube 336 together.

The left shock absorber 33 attenuates the displacement of the left front wheel 31 relative to the left front outer tube 333 and the left rear outer tube 335 along the left extending and contracting axis c as a result of the left front telescopic element 331 extending or contracting and the left rear telescopic element 332 extending or contracting.

As shown in FIG. 3, the right shock absorber 34 is preferably a so-called telescopic shock absorber. The right shock absorber 34 includes a right front telescopic element 341, a right rear telescopic element 342, and a right inner connector 347.

The right front telescopic element 341 includes a right front outer tube 343 and a right front inner tube 344. A lower portion of the right front inner tube 344 is connected to the right inner connector 347. An upper portion of the right front inner tube 344 is inserted into the right front outer tube 343. An upper portion of the right front outer tube 343 is connected to the right bracket 327. The right front inner tube 344 is displaced relative to the right front outer tube 343 along a right extending and contracting axis d that extends in the up-and-down direction of the body frame 21. The right front telescopic element 341 extends and contracts in the direction of the right extending and contracting axis d as a result of the right front inner tube 344 being displaced relative to the right front outer tube 343 along the right extending and contracting axis d. The right extending and contracting axis d extends at an angle at which the right extending and contracting axis d is inclined slightly relative to the up-and-down direction of the body frame 21.

At least a portion of the right rear telescopic element 342 is provided behind the right front telescopic element 341. The right rear telescopic element 342 includes a right rear outer tube 345 and a right rear inner tube 346. The right rear outer tube 345 and the right front outer tube 343 are connected together so as not to move.

A lower portion of the right rear inner tube 346 is connected to the right inner connector 347. An upper portion of the right rear inner tube 346 is inserted into the right rear outer tube 345. An upper portion of the right rear outer tube 345 is connected to the right bracket 327.

The right rear inner tube 346 is displaced relative to the right rear outer tube 345 along the right extending and contracting axis d that extends in the up-and-down direction of the body frame 21. The right rear telescopic element 342 extends and contracts in the direction of the right extending and contracting axis d as a result of the right rear inner tube 346 being displaced relative to the right rear outer tube 345 along the right extending and contracting axis d.

The right inner connector 347 supports a right axle member 321 of the right front wheel 32 rotatably. The right inner connector 347 connects a lower portion of the right front inner tube 344 and a lower portion of the right rear inner tube 346 together.

The right shock absorber 34 attenuates the displacement of the right front wheel 32 relative to the right front outer tube 343 and the right rear outer tube 345 along the right extending and contracting axis d as a result of the right front telescopic element 341 extending or contracting and the right rear telescopic element 342 extending or contracting.

Figure 4:
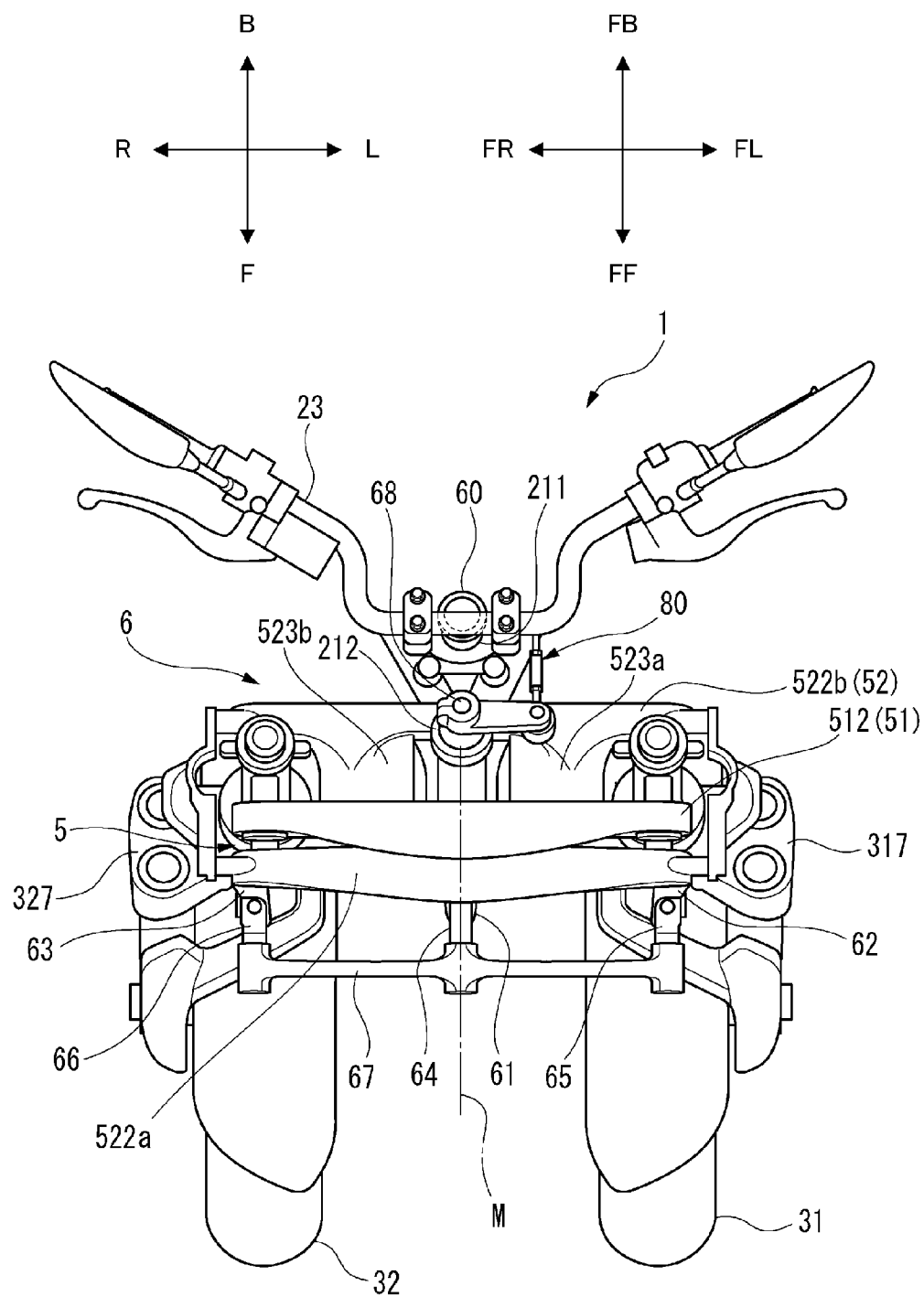
FIG. 4 is a plan view showing the front portion of the vehicle shown in FIG. 1.

As shown in FIG. 4, the vehicle 1 includes the steering force transmission 6. The steering force transmission 6 includes a handlebar 23 (an example of a steering force input portion), the upstream side steering shaft 60 (the example of the rear shaft member), a connecting member 80, and a downstream side steering shaft 68 (an example of a front shaft member).

The body frame 21 includes the headstock 211 that supports the upstream side steering shaft 60 so as to turn and the link support 212 that supports the downstream side steering shaft 68 so as to turn. The link support 212 extends in the direction of a middle center axis Z that extends in the up-and-down direction of the body frame 21, as shown in FIG. 2. In the present preferred embodiment, a turning center (a central steering axis) of the handlebar 23 coincides with a turning center (a rear axis) of the upstream side steering shaft.

A steering force is inputted into the handlebar 23. The upstream side steering shaft 60 is connected to the handlebar 23. An upper portion of the upstream side steering shaft 60 is disposed behind a lower portion of the upstream side steering shaft 60 in a front-and-rear direction of the body frame 21. The upstream side steering shaft 60 is supported in the headstock 211 so as to turn.

The connecting member 80 connects the upstream side steering shaft 60 and the downstream side steering shaft 68 together. The connecting member 80 is displaced as the upstream side steering shaft 60 turns. The connecting member 80 transmits the turning motion of the upstream side steering shaft 60 to the downstream side steering shaft 68.

The downstream side steering shaft 68 is supported in the link support 212 so as to turn. The downstream side steering shaft 68 is connected to the connecting member 80. The downstream side steering shaft 68 is provided ahead of the upstream side steering shaft 60 in the front-and-rear direction of the body frame 21. The downstream side steering shaft 68 turns as the connecting member 80 is displaced. As a result of the downstream side steering shaft 68 turning, the left front wheel 31 and the right front wheel 32 are steered via a tie-rod 67.

The steering force transmission 6 transmits a steering force exerted on the handlebar 23 by the rider when operating the handlebar 23 to the left bracket 317 and the right bracket 327. A specific configuration will be described in detail below.

In the vehicle 1 according to the present preferred embodiment, the linkage 5 includes a four parallel joint link system (also referred to as a parallelogram link).

As shown in FIG. 2, the linkage 5 is disposed above the left front wheel 31 and the right front wheel 32. The linkage 5 includes an upper cross member 51, a lower cross member 52, a left side member 53, and a right side member 54. The linkage 5 is supported so as to turn by the link support 212 that extends in the direction of the middle center axis Z. Even though the upstream side steering shaft 60 is turned as a result of the operation of the handlebar 23, the linkage 5 is prevented from following the rotation of the upstream side steering shaft 60 and does not turn.

The upper cross member 51 includes a plate member 512. The plate member 512 is disposed ahead of the link support 212. The plate member 512 extends in the left-and-right direction of the body frame 21.

A middle portion of the upper cross member 51 is connected to the link support 212 by a connecting portion C. The upper cross member 51 turns relative to the link support 212 about a middle upper axis M that passes through the connecting portion C and extends in the front-and-rear direction of the body frame 21.

A left end portion of the upper cross member 51 is connected to the left side member 53 by a connecting portion A. The upper cross member 51 turns relative to the left side member 53 about a left upper axis that passes through the connecting portion A to extend in the front-and-rear direction of the body frame 21.

A right end portion of the upper cross member 51 is connected to the right side member 54 by a connecting portion E. The upper cross member 51 turns relative to the right side member 54 about a right upper axis that passes through the connecting portion E to extend in the front-and-rear direction of the body frame 21.

FIG. 4 is a plan view of the front portion of the vehicle 1 as seen from above the body frame 21. In FIG. 4, the vehicle 1 is standing upright. The following description, which will be made by reference to FIG. 4, is based on the premise that the vehicle 1 is standing upright.

As shown in FIG. 4, the lower cross member 52 includes a front plate member 522a and a rear plate member 522b. The front plate member 522a is disposed ahead of the link support 212. The rear plate member 522b is disposed behind the link support 212. The front plate member 522a and the rear plate member 522b extend in the left-and-right direction of the body frame 21. The front plate member 522a and the rear plate member 522b are connected together by a left connecting block 523a and a right connecting block 523b. The left connecting block 523a is disposed on the left of the link support 212. The right connecting block 523b is disposed on the right of the link support 212.

Returning to FIG. 2, the lower cross member 52 is disposed below the upper cross member 51. The lower cross member 52 extends parallel or substantially parallel to the upper cross member 51. A middle portion of the lower cross member 52 is connected to the link support 212 by a connecting portion I. The lower cross member 52 turns about a middle lower axis that passes through the connecting portion I to extend in the front-and-rear direction of the body frame 21.

A left end portion of the lower cross member 52 is connected to the left side member 53 by a connecting portion G. The lower cross member 52 turns about a left lower axis that passes through the connecting portion G to extend in the front-and-rear direction of the body frame 21.

A right end portion of the lower cross member 52 is connected to the right side member 54 by a connecting portion H. The lower cross member 52 turns about a right lower axis that passes through the connecting portion H to extend in the front-and-rear direction of the body frame 21. A length of the upper cross member 51 from the connecting portion E to the connecting portion A is equal or substantially equal to a length of the lower cross member from the connecting portion H to the connecting portion G.

The middle upper axis M, the right upper axis, the left upper axis, the middle lower axis, the right lower axis, and the left lower axis extend parallel to one another. The middle upper axis M, the right upper axis, the left upper axis, the middle lower axis, the right lower axis, and the left lower axis are disposed above the left front wheel 31 and the right front wheel 32.

As shown in FIGS. 2 and 4, the left side member 53 is disposed on the left of the link support 212. The left side member 53 is disposed above the left front wheel 31. The left side member 53 extends parallel or substantially parallel to the middle center axis Z of the link support 212. An upper portion of the left side member 53 is disposed behind a lower portion thereof.

A lower portion of the left side member 53 is connected to the left bracket 317. The left bracket 317 turns about a left center axis X relative to the left side member 53. The left center axis X extends parallel or substantially parallel to the middle center axis Z of the link support 212.

As shown in FIGS. 2 and 4, the right side member 54 is disposed on the right of the link support 212. The right side member 54 is disposed above the right front wheel 32. The right side member 54 extends parallel or substantially parallel to the middle center axis Z of the link support 212. An upper portion of the right side member 54 is disposed behind a lower portion thereof.

A lower portion of the right side member 54 is connected to the right bracket 327. The right bracket 327 turns about a right center axis Y relative to the right side member 54. The right center axis X extends parallel or substantially parallel to the middle center axis Z of the link support 212.

Thus, as has been described above, the upper cross member 51, the lower cross member 52, the left side member 53, and the right side member 54 are supported by the link support 212 so that the upper cross member 51 and the lower cross member 52 are held in postures which are parallel or substantially parallel to each other and so that the left side member 53 and the right side member 54 are held in postures which are parallel or substantially parallel to each other.

As shown in FIGS. 2 and 4, the steering force transmission 6 includes a middle transmission plate 61, a left transmission plate 62, a right transmission plate 63, a middle joint 64, a left joint 65, a right joint 66, and the tie-rod 67.

The middle transmission plate 61 is connected to a lower portion of the downstream side steering shaft 68. The middle transmission plate 61 cannot turn relative to the downstream side steering shaft 68. The middle transmission plate 61 turns about the middle center axis Z relative to the link support 212.

The left transmission plate 62 is disposed on the left of the middle transmission plate 61. The left transmission plate 62 is connected to the left bracket 317. The left transmission plate 62 cannot turn relative to the left bracket 317. The left transmission plate 62 turns about the left center axis X relative to the left side member 53.

The right transmission plate 63 is disposed on the right of the middle transmission plate 61. The right transmission plate 63 is connected to the right bracket 327. The right transmission plate 63 cannot turn relative to the right bracket 327. The right transmission plate 63 turns about the right center axis Y relative to the right side member 54.

As shown in FIG. 4, the middle joint 64 is connected to a front portion of the middle transmission plate 61 via a shaft portion that extends in the up-and-down direction of the body frame 21. The middle transmission plate 61 and the middle joint 64 are able to turn relative to each other about this shaft portion.

The left joint 65 is disposed directly on the left of the middle joint 64. The left joint 65 is connected to a front portion of the left transmission plate 62 via a shaft that extends in the up-down direction of the body frame. The left transmission plate 62 and the left joint 65 are able to turn relative to each other about this shaft portion.

The right joint 66 is disposed directly on the right of the middle joint 64. The right joint 66 is connected to a front portion of the right transmission plate 63 via a shaft that extends in the up-down direction of the body frame. The right transmission plate 63 and the right joint 66 are able to turn relative to each other about this shaft portion.

A shaft portion that extends in the front-and-rear direction of the body frame 21 is provided at a front portion of the middle joint 64. A shaft portion that extends in the front-and-rear direction of the body frame 21 is provided at a front portion of the left joint 65. A shaft portion that extends in the front-and-rear direction of the body frame 21 is provided at a front portion of the right joint 66.

The tie-rod 67 extends in the left-and-right direction of the body frame 21. The tie-rod 67 is connected to the middle joint 64, the left joint 65, and the right joint 66 via those shaft portions. The tie-rod 67 and the middle joint 64 turn relative to each other about the shaft portion that is provided at the front portion of the middle joint 64. The tie-rod 67 and the left joint 65 turn relative to each other about the shaft portion that is provided at the front portion of the left joint 65. The tie-rod 67 and the right joint 66 turn relative to each other about the shaft portion that is provided at the front portion of the right joint 66.

Figure 5:
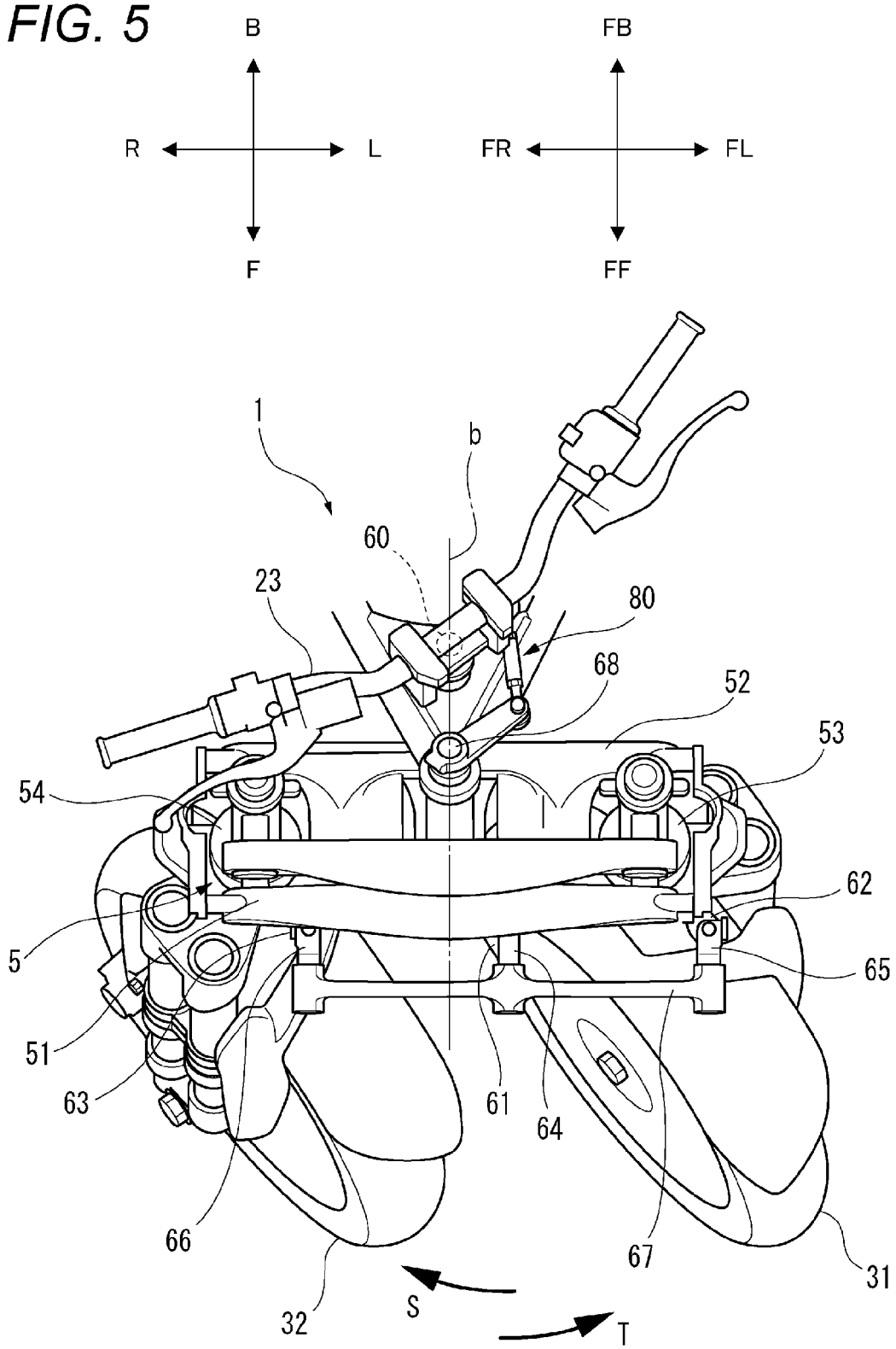
FIG. 5 is a plan view showing the front portion of the vehicle shown in FIG. 1 when the vehicle is steered.

Next, referring to FIGS. 4 and 5, a steering operation of the vehicle 1 will be described. FIG. 5 is a plan view, as seen from above the body frame 21, of the front portion of the vehicle 1 in such a state that the left front wheel 31 and the right front wheel 32 are steered or turned to the left.

When the rider operates the handlebar 23, the upstream side steering shaft 60 turns. The turning of the upstream side steering shaft 60 is transmitted to the downstream side steering shaft 68 via the connecting member 80. The downstream side steering shaft 68 turns relative to the link support 212 about a front steering axis b. In the case of the vehicle 1 being steered to the left as shown in FIG. 5, as the handlebar 23 is operated, the middle transmission plate 61 turns relative to the link support 212 in a direction indicated by an arrow T about the front steering axis b.

In association with the turning of the middle transmission plate 61 in the direction indicated by the arrow T, the middle joint 64 of the tie-rod 67 turns relative to the middle transmission plate 61 in a direction indicated by an arrow S. This moves the tie-rod 67 leftwards and rearwards while keeping its posture as it is.

As the tie-rod 67 moves leftwards and rearwards, the left joint 65 and the right joint 66 of the tie-rod 67 turn in the direction indicated by the arrow S relative to the left transmission plate 62 and the right transmission plate 63, respectively. This turns the left transmission plate 62 and the right transmission plate 63 in the direction indicated by the arrow T while allowing the tie-rod 67 to keep its posture.

When the left transmission plate 62 turns in the direction indicated by the arrow T, the left bracket 317, which cannot turn relative to the left transmission plate 62, turns in the direction indicated by the arrow T about the left center axis X relative to the left side member 53.

When the right transmission plate 63 turns in the direction indicated by the arrow T, the right bracket 327, which cannot turn relative to the right transmission plate 63, turns in the direction indicated by the arrow T about the right center axis Y relative to the right side member 54.

When the left bracket 317 turns in the direction indicated by the arrow T, the left shock absorber 33, which is connected to the left bracket 317 via the left front outer tube 333 and the left rear outer tube 335, turns in the direction indicated by the arrow T about the left center axis X relative to the left side member 53. When the left shock absorber 33 turns in the direction indicated by the arrow T, the left front wheel 31, which is supported on the left shock absorber 33, turns in the direction indicated by the arrow T about the left center axis X relative to the left side member 53.

When the right bracket 327 turns in the direction indicated by the arrow T, the right shock absorber 34, which is connected to the right bracket 327 via the right front outer tube 343 and the right rear outer tube 345, turns in the direction indicated by the arrow T about the right center axis Y relative to the right side member 54. When the right shock absorber 34 turns in the direction indicated by the arrow T, the right front wheel 32, which is supported on the right shock absorber 34, turns in the direction indicated by the arrow T about the right center axis Y relative to the right side member 54.

When the rider operates the handlebar 23 so as to turn to the right, the elements described above turn in the direction indicated by the arrow S. Since the elements only move the other way around in relation to the left-and-right direction, the detailed description thereof will be omitted here.

Thus, as has been described above, as the rider operates the handlebar 23, the steering force transmission 6 transmits the steering force accordingly to the left front wheel 31 and the right front wheel 32. The left front wheel 31 and the right front wheel 32 turn about the left center axis X and the right center axis Y, respectively, in the direction corresponding to the direction in which the handlebar 23 is operated by the rider.

Figure 6:
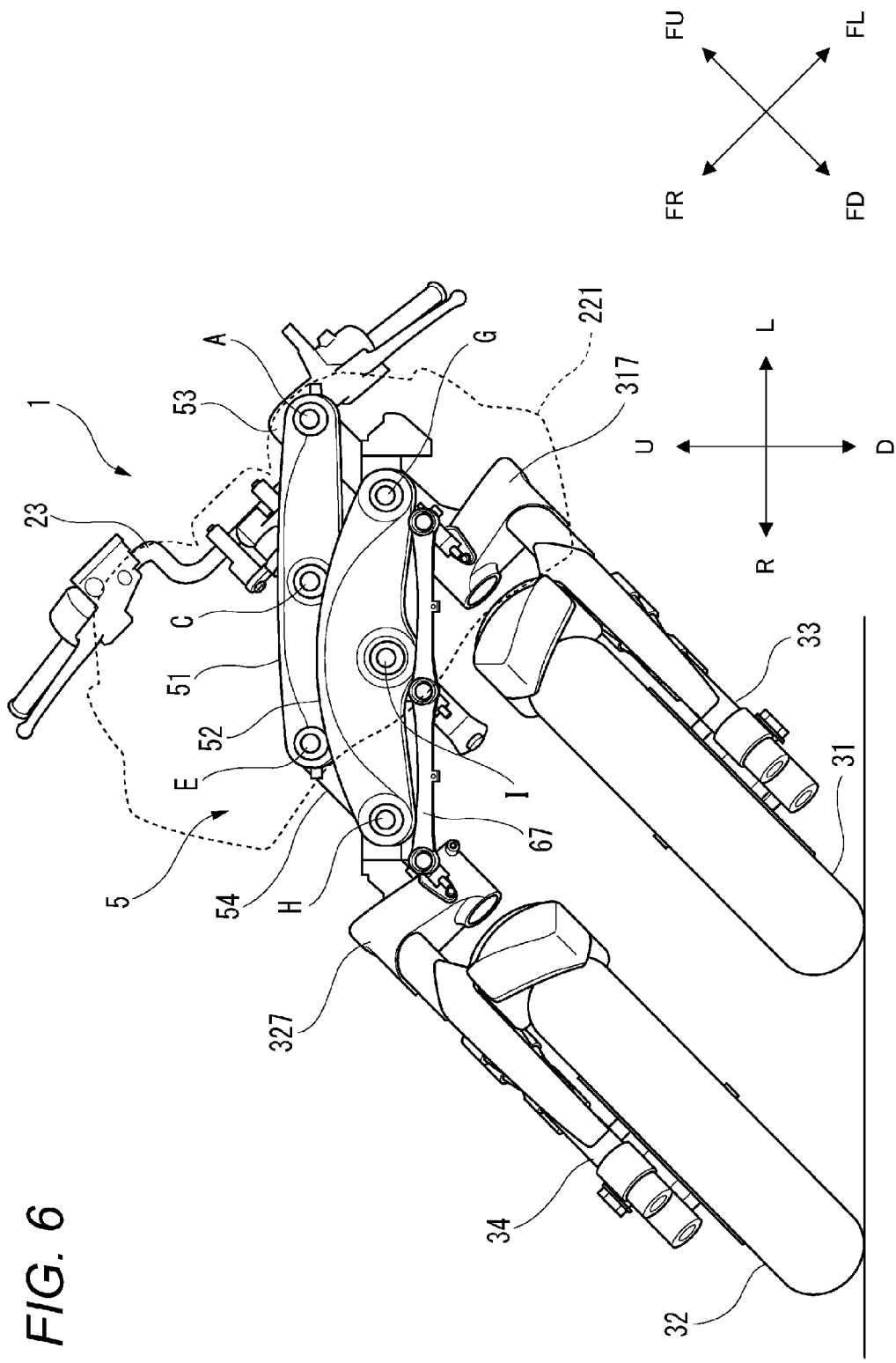
FIG. 6 is a front view showing the front portion of the vehicle shown in FIG. 1 when the vehicle is caused to lean.

Next, referring to FIGS. 2 and 6, a leaning operation of the vehicle 1 will be described. FIG. 6 is a front view of the front portion of the vehicle 1 as viewed from the front of the body frame 21 in such a state that the body frame 21 leans to the left of the vehicle 1. FIG. 6 shows a state as seen through the front cover 221 that is indicated by dashed lines.

As shown in FIG. 2, in such a state that the vehicle 1 is standing upright, when looking at the vehicle 1 from the front of the body frame 21, the linkage 5 has a rectangular or substantially rectangular shape. As shown in FIG. 6, with the vehicle 1 leaning to the left, when looking at the vehicle 1 from the front of the body frame 21, the linkage 5 has a parallelogram shape.

The deformation of the linkage 5 is associated with the leaning of the body frame 21 in the left-and-right direction of the vehicle 1. The operation of the linkage 5 means that the upper cross member 51, the lower cross member 52, the left side member 53, and the right side member 54 which define the linkage 5 turn relatively about turning axes which pass through the corresponding connecting portions A, C, E, G, H, I, such that the shape of the linkage 5 changes.

For example, as shown in FIG. 6, when the rider causes the vehicle 1 to lean to the left, the link support 212 leans to the left from the vertical direction. When the link support 212 leans, the upper cross member 51 turns counterclockwise as seen from the front of the vehicle 1 about the middle upper axis M that passes through the connecting portion C relative to the link support 212. Similarly, the lower cross member 52 turns counterclockwise as seen from the front of the vehicle 1 about the middle lower axis that passes through the connecting portion I relative to the link support 212. This causes the upper cross member 51 to move to the left relative to the lower cross member 52.

As the upper cross member 51 moves to the left, the upper cross member 51 turns counterclockwise as seen from the front of the vehicle 1 about the left upper axis which passes through the connecting portion A and the right upper axis which passes through the connecting portion E relative to the left side member 53 and the right side member 54, respectively. Similarly, the lower cross member 52 turns counterclockwise as seen from the front of the vehicle 1 about the left lower axis which passes through the connecting portion G and the right lower axis which passes through the connecting portion H relative to the left side member 53 and the right side member 54, respectively. This causes the left side member 53 and the right side member 54 to lean to the left from the vertical direction while allowing them to keep their postures that are parallel or substantially parallel to the link support 212.

As this occurs, the lower cross member 52 moves to the left relative to the tie-rod 67. As the lower cross member 52 moves to the left, the shaft portions which are provided at the respective front portions of the middle joint 64, the left joint 65, and the right joint 66 turn relative to the-tie rod 67. This allows the tie-rod 67 to maintain a parallel or substantially parallel posture to the upper cross member 51 and the lower cross member 52.

As the left side member 53 leans to the left, the left bracket 317 that is connected to the left side member 53 leans to the left. As the left bracket 317 leans to the left, the left shock absorber 33 which is connected to the left bracket 317 leans to the left. As the left shock absorber 33 leans to the left, the left front wheel 31 that is supported on the left shock absorber 33 leans to the left while maintaining a posture that is parallel or substantially parallel to the link support 212.

As the right side member 54 leans to the left, the right bracket 327 that is connected to the right side member 54 leans to the left. As the right bracket 327 leans to the left, the right shock absorber 34 that is connected to the right bracket 327 leans to the left. As the right shock absorber 34 leans to the left, the right front wheel 32 that is supported on the right shock absorber 34 leans to the left while maintaining a posture that is parallel or substantially parallel to the link support 212.

The description of the leaning operations of the left front wheel 31 and the right front wheel 32 is made based on the vertical direction. However, when the vehicle 1 leans (when the linkage 5 is operated), the up-and-down direction of the body frame 21 does not coincide with the vertical up-and-down direction. In the event that the leaning operations are described based on the up-and-down direction of the body frame 21, when the linkage 5 is operated, the relative positions of the left front wheel 31 and the right front wheel 32 to the body frame 21 change. In other words, the linkage 5 changes the relative positions of the left front wheel 31 and the right front wheel 32 to the body frame 21 in the up-and-down direction of the body frame 21 to cause the body frame 21 to lean relative to the vertical direction.

When the rider causes the vehicle 1 to lean to the right, the elements lean to the right. Since the elements only move the other way around in relation to the left-and-right direction, the detailed description thereof will be omitted here.

Figure 7:
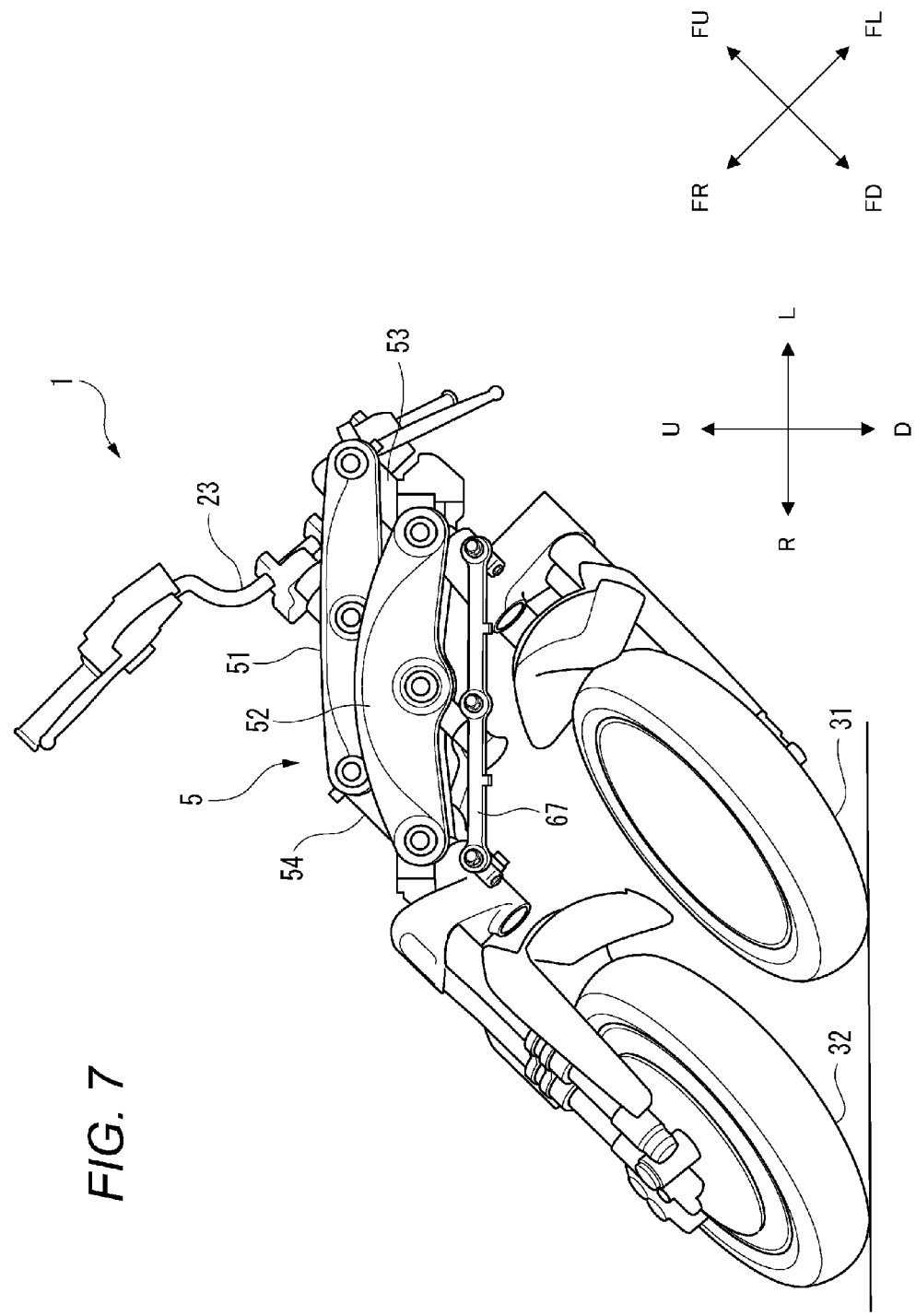
FIG. 7 is a front view showing the front portion of the vehicle shown in FIG. 1 when the vehicle is caused to lean while being steered.

FIG. 7 is a front view of the front portion of the vehicle with the vehicle 1 caused to lean and steered. FIG. 7 shows a state in which the vehicle 1 is steered or turned to the left while being caused to lean to the left. As a result of this steering operation, the left front wheel 31 and the right front wheel 32 are turned to the left, and as a result of the leaning operation, the left front wheel 31 and the right front wheel 32 lean to the left together with the body frame 21. Namely, in this state, the linkage 5 exhibits the parallelogram shape, and the tie-rod 67 moves toward the left rear from its position taken when the body frame 21 is in the upright state.

As has been described above, the vehicle 1 of the present preferred embodiment preferably includes the body frame 21 that is able to lean to the right of the vehicle 1 when the vehicle 1 turns right and lean to the left of the vehicle 1 when the vehicle 1 turns left; the right front wheel 32 that rotates about the right wheel axis; the left front wheel 31 that is provided on the left of the right front wheel 32 in relation to the left-and-right direction of the body frame 21 and which rotates about the left wheel axis J; the right shock absorber 34 that supports the right front wheel 32 at the lower portion thereof so as to enable the right front wheel 32 to be displaced relatively upwards; the left shock absorber 33 that supports the left front wheel 31 at the lower portion thereof so as to enable the left front wheel 31 to be displaced relatively upwards; and the linkage 5 that is provided on the body frame 21 so as to turn and which supports the upper portion of the right shock absorber 34 at the right portion and supports the upper portion of the left shock absorber 33 at the left portion thereof so as to enable the right front wheel 32 and the left front wheel 31 to be displaced relatively in relation to the up-and-down direction of the body frame 21.

The right shock absorber 34 preferably includes the right front telescopic element 341 including the right front outer tube 343 that extends in the direction of the right extending and contracting axis d that extends in the up-and-down direction of the body frame 21 and the right front inner tube 344 that is inserted into the right front outer tube 343 and which extends in the direction of the right extending and contracting axis d so that the lower end portion thereof is provided below the lower end portion of the right front outer tube 343; the right rear telescopic element 342 including the right rear outer tube 345 that is provided behind the right front outer tube 343 in relation to the front-and-rear direction of the body frame 21 and which extends in the direction of the right extending and contracting axis d and the right rear inner tube 346 that is inserted into the right rear outer tube 345 and which extends in the direction of the right extending and contracting axis d so that the lower end portion thereof is provided below the lower end portion of the right rear outer tube 345; and the right inner connector 347 that connects the lower portion of the right front inner tube 344 and the lower portion of the right rear inner tube 346 together.

The left shock absorber 33 preferably includes the left front telescopic element 331 including the left front outer tube 333 that extends in the direction of the left extending and contracting axis c that extends in the up-and-down direction of the body frame 21 and the left front inner tube 334 that is inserted into the left front outer tube 333 and which extends in the direction of the left extending and contracting axis c so that the lower end portion thereof is provided below the lower end portion of the left front outer tube 333; the left rear telescopic element 332 including the left rear outer tube 335 that is provided behind the left front outer tube 333 in relation to the front-and-rear direction of the body frame 21 and which extends in the direction of the left extending and contracting axis c and the left rear inner tube 336 that is inserted into the left rear outer tube 335 and which extends in the direction of the left extending and contracting axis c so that the lower end portion thereof is provided below the lower end portion of the left rear outer tube 335; and the left inner connector 337 that connects the lower portion of the left front inner tube 334 and the lower portion of the left rear inner tube 336 together.

Next, a left wheel speed sensor 40 and a left sensor wire 84 will be described in detail with reference to FIGS. 8, 9A, and 9B. A right wheel speed sensor and a right sensor wire are laterally symmetrical, and therefore, the detailed description of the right wheel speed sensor and the right wire sensor will be omitted here.

Figure 8:
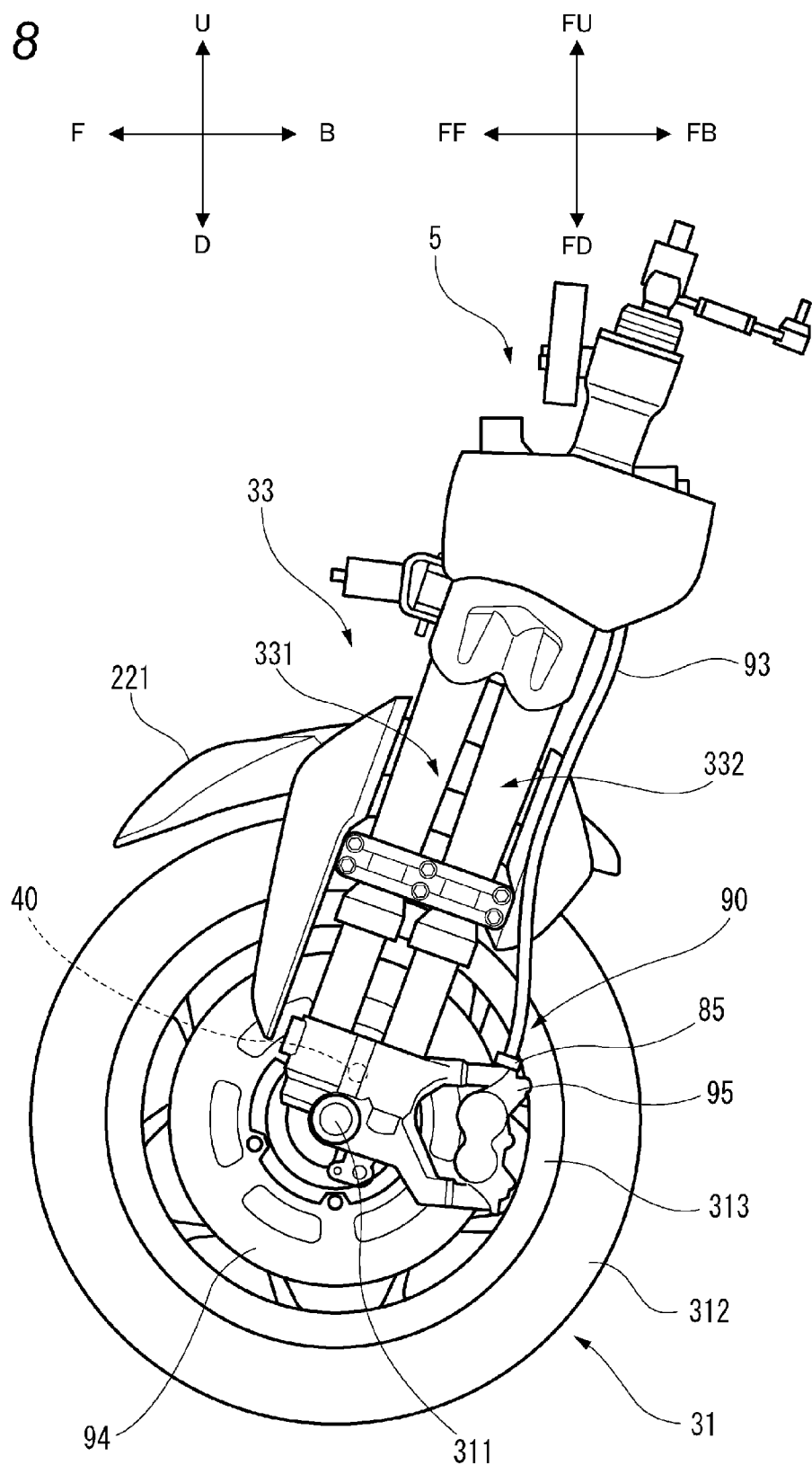
FIG. 8 is a view showing the left shock absorber as seen from the left in the direction of a left wheel axis when the vehicle is not steered at all.

FIG. 8 is a view showing the left shock absorber 33 as seen from the left in the direction of a left wheel axis J when the vehicle 1 is not steered at all. As shown in FIG. 8, the vehicle 1 includes a left brake 90 that applies a braking force to the left front wheel 31. The left brake 90 includes a left brake disc 94 that rotates together with the left front wheel 31 and a left brake caliper 95 that applies a braking force to the left brake disc 94. The left front wheel 31 includes a left axle member 311, a left tire 312, and a left wheel 313.

A left brake hose 93 is connected to the left brake caliper 95. The left brake hose 93 extends upwards from an upper portion of the left brake caliper 95. The left brake hose 93 is connected to a master cylinder or a fluid unit that performs an ABS control, which are not shown, of the vehicle 1.

The left brake caliper 95 includes a pair of left brake pads disposed so as to hold the left brake disc 94 therebetween. When the left brake caliper 95 is operated, the pair of brake pads hold the left brake disc 94 to exert a frictional force thereon. By doing so, the left brake caliper 95 exerts a braking force on the left front wheel 31.

FIGS. 9A and 9B show the left shock absorber 33. FIG. 9A is an exploded view of FIG. 8. FIG. 9B is a front view of the left shock absorber 33 when the vehicle 1 is not steered at all.

As shown in FIG. 9A, the left inner connector 337 connects the lower portion of the left front inner tube 334 and the lower portion of the left rear inner tube 336 together. A left axle support 338 is provided on the left inner connector 337. The left axle support 338 includes a through hole through which the left axle member 311 penetrates.

The left inner connector 337 includes a left caliper boss portion 339 to which the left brake caliper 95 is fixed and a left sensor stay portion 339*a* to which the left wheel speed sensor 40, which will be described below, is fixed. The left caliper boss portion 339 is provided at a rear portion of the left inner connector 337. As shown in FIG. 9B, the left sensor stay portion 339*a* is provided at a portion of the left inner connector 337 which is located on a side facing the left front wheel 31 (the left brake disc 94). The left inner connector 337 may be made of metal through casting into an integral and unitary structure, or the left caliper boss portion 339 and the left sensor stay portion 339*a* may be provided as separate elements which are bolted to the left inner connector 337 so as to define an integral unit.

As shown in FIG. 9B, a left encoder 81 is fixed to the left brake disc 94. The left encoder 81 is a ring member in which a plurality of through holes are arranged in a circumferential direction. The through holes penetrate the ring-shaped left encoder 81 in an axial direction thereof.

The vehicle 1 includes the left wheel speed sensor 40. The left wheel speed sensor 40 includes a left wheel speed detector 82 and a left sensor housing 83 that holds the left wheel speed detector 82.

The left wheel speed detector 82 is provided at a position that faces the left encoder 81. The left wheel speed detector 82 preferably includes, for example, a Hall device. The left wheel speed detector 82 transmits an electric signal corresponding to the number of through holes that pass the left encoder 81 to the ECU. The ECU calculates a rotation speed of the left front wheel 31 from the electric signal that is outputted from the left wheel speed detector 82.

The left sensor wire 84 is connected to the left wheel speed sensor 40. The left sensor wire 84 is connected to the left wheel speed sensor 40 and the ECU (Engine Control Unit). In the following description, a side located closer to the ECU will be referred to as an upstream side of the left sensor wire 84, and a side located closer to the left wheel speed sensor 40 will be referred to as a downstream side thereof.

The left sensor wire 84 is restricted or prevented from being deformed by a left lower restrictor 85. The left lower restrictor 85 preferably includes, for example, a clip that holds the left sensor wire 84, a tube member through which the left sensor wire 84 passes, or a band member that extends across the left sensor wire 84.

The left lower restrictor 85 is provided on a member that moves relatively together with the left inner connector 337 when the left shock absorber 33 is operated. The left lower restrictor 85 is provided on the left brake caliper 95. The left lower restrictor 85 restricts or prevents the deformation of the left sensor wire 84 so as to prevent the left sensor wire 84 from being brought into contact with at least the left front outer tube 333 and the left rear outer tube 335 when the left shock absorber 33 is operated.

As shown in FIG. 9B, when looking at the vehicle 1 from the front and the vehicle is standing upright and not steered at all, at least a portion of the left wheel speed sensor 40 is disposed closer to the left front wheel 31 than an outer edge of a side of the left front inner tube 334 that is located opposite to a side facing the left front wheel 31 (an opposite side to the left brake disc 94 in the figure) in relation to the direction of the left wheel axis J. A left edge of the left wheel speed sensor 40 is disposed on the right of a left edge of the left front inner tube 334 when looking at the vehicle 1 from the front and is standing upright and which is not steered at all. In the illustrated example, with the vehicle 1 standing upright and not steered at all, a right end of the left wheel speed sensor 40 is disposed on the right of a left end of the left front inner tube 334. With the vehicle 1 standing upright and not steered at all, at least a portion of the left wheel speed sensor 40 overlaps the left front inner tube 334.

As shown in FIG. 9A, at least a portion of the left wheel speed sensor 40 is provided between a left front imaginary line N that extends along a rear edge of the left front inner tube 334 and a left rear imaginary line Q that extends along a front edge of the left rear inner tube 336 when seen from the direction of the left wheel axis J. In the illustrated example, the entire left wheel speed sensor 40 is disposed between the left front imaginary line N and the left rear imaginary line Q.

In addition, at least a portion of the left wheel speed sensor 40 is disposed above a lower end of the left shock absorber 33 in relation to an up-and-down direction of the left extending and contracting axis c when seen from the direction of the left wheel axis J. In the illustrated example, a lower end portion of the left inner connector 337 defines a lower end of the left shock absorber 33.

FIG. 9B shows a state in which the left shock absorber 33 extends to its maximum extent. In this state, a distance over which an upper end of the left inner connector 337 is spaced away from a lower end of the left front outer tube 333 becomes the greatest, and a distance over which the upper end of the left inner connecting portion 337 is spaced away from a lower end of the left rear outer tube 335 becomes the greatest.

The left wire sensor 84 extends across the left front imaginary line N or the left rear imaginary line Q below either of the lower end of the left front outer tube 333 and the lower end of the left rear outer tube 335 which is lower than the other of the lower end of the left front outer tube 333 and the lower end of the left rear outer tube 335 when the left shock absorber 33 extends to its maximum extent. In the illustrated example, in the up-and-down direction of the left extending and contracting axis c, the lower end of the left front outer tube 333 and the lower end of the left rear outer tube 335 stay in the same position.

Additionally, at least a portion of the left lower restrictor 85 is provided on the left brake caliper 95 that is not displaced relative to the left inner connector 337 in a position located behind the left rear imaginary line Q in relation to the front-and-rear direction of the body frame 21 when looking at the vehicle from the direction of the left wheel axis J.

Namely, the vehicle 1 according to the present preferred embodiment satisfies condition (B) below. Condition (B) includes a structure that the vehicle 1 includes the left wheel speed sensor 40 including the left wheel speed detector 82 that detects a wheel speed of the left front wheel 31 and the left sensor housing 83 that holds the left wheel speed detector 82; and the left lower restrictor 85 that restricts or prevents the deformation of the left sensor wire 84 that extends from the left wheel speed sensor 40 to the ECU (Engine Control Unit) so that the left sensor wire 84 is prevented from coming into contact with at least the left front outer tube 333 and the left rear outer tube 335 when the left shock absorber 33 is operated. A structure that the left wheel speed sensor 40 is such that when looking at the vehicle 1 from the front and the vehicle is standing upright and not steered at all, at least a portion of the left wheel speed sensor 40 is disposed closer to the left front wheel 31 than the outer edge of the side of the left front inner tube 334 which is located opposite to the left front wheel 31 in relation to the direction of the left wheel axis J and that when looking at the vehicle from the direction of the left wheel axis J, at least a portion of the left wheel speed sensor 40 is provided between the left front imaginary line N that extends along the rear edge of the left front inner tube 334 and the left rear imaginary line Q that extends along the front edge of the left rear inner tube 336 and is disposed above the lower end of the left shock absorber 33 in relation to the up-and-down direction of the left extending and contacting axis c when looking at the vehicle from the direction of the left wheel axis J, a structure that the left sensor wire 84 extends across the left front imaginary line N or the left rear imaginary line Q below either of the lower end of the left front outer tube 333 and the lower end of the left rear outer tube 335 which is located lower than the other of the lower end of the left front outer tube 333 and the lower end of the left rear outer tube 335 when the left shock absorber 33 extends to its maximum extent, and a structure that, when looking at the vehicle from the direction of the left wheel axis J, at least a portion of the left lower restrictor 85 is provided on the left inner connector 337 or the member that is not displaced relative to the left inner connector 337 in the position that is located ahead of the left front imaginary line N in relation to the front-and-rear direction of the body frame 21 or the position that is located behind the left rear imaginary line Q in relation to the front-and-rear direction of the body frame 21.

In the vehicle 1 according to the present preferred embodiment, according to the condition (B), the following advantageous effects are provided.

In the left wheel speed sensor 40, when looking at the vehicle 1 from the front and the vehicle is standing upright and not steered at all, at least a portion thereof is provided closer to the left front wheel 31 than the outer edge of the side of the left front inner tube 334 that is located opposite to the left front wheel 31 in relation to the direction of the left wheel axis J. Namely, the left front inner tube 334 protects at least a portion of the left wheel speed sensor 40 from stones, mud, water and the like which come flying from the front of the vehicle 1.

At least a portion of the left wheel speed sensor 40 is provided on the left inner connector 337 between the left front imaginary line N that extends along the rear edge of the left front inner tube 334 and the left rear imaginary line Q that extends along the front edge of the left rear inner tube 336 when seen from the direction of the left wheel axis J. In addition, the left wheel speed sensor 40 is disposed above the lower end of the left shock absorber 33 when looking at the vehicle from the direction of the left wheel axis J.

At least a portion of the left wheel speed sensor 40 is held by the left front inner tube 334 and the left rear inner tube 336 therebetween in relation to the front-and-rear direction when looking at the vehicle from the direction of the left wheel axis J. Therefore, the left wheel speed sensor 40 is protected from stones, mud, and water that are splashed thereon from the front. In addition, the left wheel speed sensor 40 is also protected from stones, mud and water that are splashed thereon from below by the left shock absorber 33.

The left sensor wire 84 crosses the left front imaginary line N or the left rear imaginary line Q below the lower end of the left front outer tube 333 or the lower end of the left rear outer tube 335 in such a state that the left front outer tube 333 and the left rear outer tube 335 extend to their maximum extent. Thus, there are concerns that the left sensor wire 84 interferes with the left front outer tube 333 and the left rear outer tube 335 when the left shock absorber 33 is operated. According the vehicle 1 that satisfies the condition (B), however, the above interference is prevented for the following reasons.

Both the left wheel speed sensor 40 and the left lower restrictor 85 are provided on the left inner connector 337 or the member that is displaced relatively together with the left inner connector 337 when the left shock absorber 33 is operated. Due to this, even though the left shock absorber 33 is operated, the portion of the left sensor wire 84 that is located between the left wheel speed sensor 40 and the left lower restrictor 85 is prevented from being deformed.

According to the vehicle 1 that satisfies the condition (B), the left lower restrictor 85 is provided ahead of the left front imaginary line N or behind the left rear imaginary line Q. Namely, in the left sensor wire 84, the portion that crosses the left front imaginary line N or the left rear imaginary line Q corresponds to the portion that extends from the left wheel speed sensor 40 to the left lower restrictor 85 and which is prevented from being deformed. Due to this, even though the left shock absorber 33 operates, it becomes difficult for the left sensor wire 84 to interfere with the left front outer tube 333 or the left rear outer tube 335. Consequently, the left sensor wire 84 is laid out even in an area where interference would appear to easily occur, such that the degree of freedom in laying out the left sensor wire 84 is enhanced.

In the preferred embodiment described above, the left lower restrictor 85 is described as being provided on the left brake caliper 95. However, the present invention is not limited thereto. The left lower restrictor 85 may be provided directly on the left inner connector 337. The left lower restrictor 85 may be provided on the left sensor stay portion 339*a* that is fixed to the left inner connector 337. The left lower restrictor 85 is preferably provided on a member that displaces relatively together with the left inner connector 337 when the left shock absorber 33 is operated.

In the preferred embodiment described above, the left lower restrictor 85 and the left wheel speed sensor 40 are described as being provided as the separate elements. However, the present invention is not limited thereto. The left lower restrictor 85 may be provided integrally with the left sensor housing 83 of the left wheel speed sensor 40. Alternatively, the left lower restrictor 85 may be provided integrally with the left sensor stay portion 339*a* to which the left wheel speed sensor 40 is attached.

The left lower restrictor 85 may be welded directly to the left front inner tube 334 or the left rear inner tube 336. As this occurs, the left lower restrictor 85 is provided at a portion on the left front inner tube 334 or the left rear inner tube 336 which does not interfere with the left front outer tube 333 or the left rear outer tube 335 even when the left shock absorber 33 is operated.

In the vehicle 1 according to the present preferred embodiment, a right wheel speed sensor, a right sensor wire, and a right lower restrictor are preferably constructed laterally symmetrical with the left wheel speed sensor 40, the left sensor wire 84, and the left lower restrictor 85. Due to this, the vehicle 1 according to the present preferred embodiment satisfies a condition (A) below.

Condition (A) includes a structure that the vehicle 1 includes a right wheel speed sensor including a right wheel speed detector that detects a wheel speed of the right front wheel and a right sensor housing that holds the right wheel speed detector; and a right lower restrictor that restricts or prevents the deformation of a right sensor wire that extends from the right wheel speed sensor to the ECU (Engine Control Unit) that is provided on the body frame 21 so that the right sensor wire is prevented from coming into contact with at least the right front outer tube and the right rear outer tube when the right shock absorber is operated, a structure that the right wheel speed sensor is such that when looking at the vehicle from the front and the vehicle is standing upright and not steered at all, at least a portion of the right wheel speed sensor is disposed closer to the right front wheel than an outer edge of a side of the right front inner tube which is located opposite to the right front wheel in relation to the direction of the right wheel axis and that when looking at the vehicle from the direction of the right wheel axis, at least a portion of the right wheel speed sensor is provided between a right front imaginary line that extends along a rear edge of the right front inner tube and a right rear imaginary line that extends along a front edge of the right rear inner tube and is disposed above a lower end of the right shock absorber in relation to an up-and-down direction of the right extending and contacting axis when looking at the vehicle from the direction of the right wheel axis, a structure that the right sensor wire extends across the right front imaginary line or the right rear imaginary line below either of a lower end of the right front outer tube and a lower end of the right rear outer tube which is located lower than the other of the lower end of the right front outer tube and the lower end of the right rear outer tube when the right shock absorber extends to its maximum extent, and a structure that, when looking at the vehicle from the direction of the right wheel axis, at least a portion of the right lower restrictor is provided on the right inner connector or a member that is not displaced relative to the right inner connector in a position that is located ahead of the right front imaginary line in relation to the front-and-rear direction of the body frame 21 or a position that is located behind the right rear imaginary line in relation to the front-and-rear direction of the body frame 21.

In the vehicle 1 according to the present preferred embodiment, according to the condition (A), the following advantageous effects are provided.

In the right wheel speed sensor, when looking at the vehicle from the front and the vehicle is standing upright and not steered at all, at least a portion of the right wheel speed sensor is disposed closer to the right front wheel than the outer edge of the side of the right front inner tube that is located opposite to the right front wheel in relation to the direction of the right wheel axis. Namely, the right front inner tube protects at least a portion of the right wheel speed sensor from stones, mud, water and the like which come flying from the front of the vehicle 1.

At least a portion of the right wheel speed sensor is provided on the right inner connector between the right front imaginary line extending along the rear edge of the right front inner tube and the right rear imaginary line extending along the front edge of the right rear inner tube when looking at the vehicle from the direction of the right wheel axis. In addition, the right wheel speed sensor is disposed above the lower end of the right shock absorber when looking at the vehicle from the direction of the right wheel axis.

At least a portion of the right wheel speed sensor is held by the right front inner tube and the right rear inner tube therebetween in relation to the front-and-rear direction when looking at the vehicle from the direction of the right wheel axis. Therefore, the right wheel speed sensor is protected from stones, mud, and water that are splashed thereon from the front. In addition, the right wheel speed sensor is also protected from stones, mud, and water that are splashed thereon from below by the right shock absorber.

The right sensor wire crosses the front imaginary line or the rear imaginary line below the lower end of the right front outer tube or the lower end of the right rear outer tube in such a state that the right front outer tube and the right rear outer tube extend to their maximum extent. Thus, there are concerns that the right sensor wire interferes with the right front outer tube and the right rear outer tube when the right shock absorber is compressed to its maximum extent. However, according to the vehicle 1 that satisfies condition (A), the interference is prevented for the following reasons.

Both the right wheel speed sensor and the right lower restrictor are provided on the right inner connector or the member that is displaced relatively together with the right inner connector when the right shock absorber is operated. Due to this, even though the right shock absorber operates, in the right sensor wire, a portion located between the right wheel speed sensor to the right lower restrictor is prevented from being deformed.

According to the vehicle 1 that satisfies the condition (A), the right lower restrictor is provided ahead of the right front imaginary line or behind the right rear imaginary line. Namely, in the right sensor wire, the portion that crosses the right front imaginary line or the right rear imaginary line corresponds to the portion that extends from the right wheel speed sensor to the right lower restrictor and which is prevented from being deformed. Due to this, even though the right shock absorber operates, it becomes difficult for the right sensor wire to interfere with the right front outer tube or the right rear outer tube. Consequently, the right sensor wire is laid out even in an area where interference would appear to easily occur, thus the degree of freedom in laying out the right sensor wire is enhanced.

In the preferred embodiment described above, the left wheel speed sensor 40, the left sensor wire 84, and the left lower restrictor 85 are described as being laterally symmetrical with the right wheel speed sensor, the right sensor wire, and the light lower restrictor. However, the present invention is not limited thereto. These members may be constructed or disposed laterally asymmetrical. The left sensor wire 84 and the right sensor wire may be laid out differently. Alternatively, the vehicle 1 may include the right wheel speed sensor, the right sensor wire, and the right lower restrictor without including the left wheel speed sensor 40, the left sensor wire 84, and the left lower restrictor 85. Alternatively, the vehicle 1 may include the left wheel speed sensor 40, the left sensor wire 84, and the left lower restrictor 85 without including the right wheel speed sensor, the right sensor wire, and the right lower restrictor.

According to a preferred embodiment of the present invention, the vehicle 1 preferably includes a right brake including a right brake disc that rotates together with the right front wheel and a right brake caliper that applies a braking force to the right brake disc to apply a braking force to the right front wheel; and the left brake 90 including the left brake disc 94 that rotates together with the left front wheel 31 and the left brake caliper 95 that applies the braking force to the left brake disc 94 to apply the braking force to the left front wheel 31.

As shown in FIG. 9B, the condition (A) preferably includes a structure that the right inner connector includes a right axle support that rotatably supports a right axle member of the right front wheel; and a right caliper boss to which the right brake caliper is attached, and a structure that, when looking at the vehicle from the direction of the right wheel axis, the right lower restrictor is provided on the right caliper boss at least a portion of which is provided ahead of the right front inner tube, or a structure that, when looking at the vehicle from the direction of the right wheel axis, the right lower restrictor is provided on the right caliper boss at least a portion of which is provided behind the right rear inner tube.

In addition, as shown in FIG. 9B, the condition (B) preferably includes a structure that the left inner connector 337 includes the left axle support 338 that rotatably supports the left axle member 311 of the left front wheel 31; and the left caliper boss portion 339 to which the left brake caliper 95 is attached, and a structure that, when looking at the vehicle from the direction of the left wheel axis J, the left lower restrictor 85 is provided on the left caliper boss portion at least a portion of which is provided ahead of the left front inner tube 334, or a structure that, when looking at the vehicle from the direction of the left wheel axis J, the left lower restrictor 85 is provided on the left caliper boss 339 at least a portion of which is provided behind the left rear inner tube 336. In the illustrated example, when looking at the vehicle from the direction of the left wheel axis J, the left lower restrictor 85 is provided on the left caliper boss portion 339 at least a portion of which is provided behind the left rear inner tube 336.

According to the configuration described above, the left lower restrictor 85 is strongly and rigidly attached by using the left caliper boss portion 339 that is attached with high rigidity to support the left brake caliper 95.

Different from the illustrated example, the left lower restrictor 85 may be provided on a left caliper boss portion at least a portion of which is provided ahead of the left front inner tube 334 when looking at the vehicle from the direction of the left wheel axis J. By using this configuration, the left lower restrictor 85 is strongly and rigidly attached by using the left caliper boss portion that is attached with high rigidity.

In the following description of advantageous effects of the configurations described above, since the right members are preferably laterally symmetrical with the left members and the right members provide similar advantageous effects to those provided by the left members, only advantageous effects of the left members will be described.

According to a preferred embodiment of the present invention, the vehicle 1 preferably includes the right brake including the right brake disc that rotates together with the right front wheel and the right brake caliper that applies a braking force to the right brake disc to apply a braking force to the right front wheel; and the left brake 90 including the left brake disc 94 that rotates together with the left front wheel 31 and the left brake caliper 95 that applies the braking force to the left brake disc 94 to apply the braking force to the left front wheel 31.

The condition (A) preferably includes a structure that, when looking at the vehicle 1 from the front and the vehicle 1 is not steered at all and standing upright, the right sensor wire passes between the right brake disc and the outer edge of the side of the right front inner tube which is located opposite to the right brake disc to then extend upwards.

As shown in FIG. 9A, the condition (B) preferably includes a structure that, when looking at the vehicle 1 from the front and the vehicle 1 is not steered at all and standing upright, the left sensor wire 84 passes between the left brake disc 94 and the outer edge of the side of the left front inner tube 334 which is located opposite to the left brake disc 94 (the left edge of the left front inner tube 334) to extend upwards.

According to the configuration described above, when looking at the vehicle 1 from the front and the vehicle 1 is not steered at all and standing upright, in the event that the left sensor wire 84 overlaps the left front inner tube 334, the left sensor wire 84 is protected by the left front inner tube 334 from stones or the like that are caught and thrown thereto from the front. In addition, when looking at the vehicle 1 from the front and the vehicle 1 is not steered at all and standing upright, a gap defined between the left front inner tube 334 and the left brake disc 94 is extremely small. Due to this, it becomes difficult for stones or the like that re caught and thrown from the front to enter the gap.

Due to this, in the event that the left sensor wire 84 is disposed between the left edge of the left front inner tube 334 and the left brake disc 94, the left sensor wire 84 is protected from stones or the like that are caught and thrown thereto from the front.

In the present preferred embodiment, as shown in FIG. 8, the condition (A) preferably includes a structure that a right lower restrictor is disposed inwards of an outer edge of a right wheel of the right front wheel as seen from the direction of the right wheel axis. The condition (B) preferably includes a structure that the left lower restrictor 85 is disposed inwards of an outer edge of the left wheel 313 of the left front wheel 31 as seen from the direction of the left wheel axis J.

According to the configuration described above, the portion of the left sensor wire 84 extending from the left wheel speed sensor 40 to the left lower restrictor 85 which is prevented from being deformed is provided inwards of the outer edge of the left wheel 313 of the left front wheel 31 when looking at the vehicle from the direction of the left wheel axis J. The outer edge of the left wheel 313 means an outer edge of a left wheel rim. In this way, the left lower restrictor 85 prevents the deformation of the left sensor wire 84 near the left wheel speed sensor 40, such that the left sensor wire 84 is held in a stable manner.

In the present preferred embodiment, as shown in FIG. 9A, the condition (A) preferably includes a structure that the right wheel speed sensor is disposed above the right axle member as seen from the direction of the right wheel axis.

The condition (B) preferably includes a structure that the left wheel speed sensor 40 is disposed above the left axle member 311 as seen from the direction of the left wheel axis J.

According to the configuration described above, the left wheel speed sensor 40 is protected from stones, mud, water and the like that are splashed thereon from below by the left axle member 311 and the left axle support 338.

According to a preferred embodiment of the present invention, the vehicle 1 preferably includes the right brake including the right brake disc that rotates together with the right front wheel and the right brake caliper that applies a braking force to the right brake disc to apply a braking force to the right front wheel; and the left brake 90 including the left brake disc 94 that rotates together with the left front wheel 31 and the left brake caliper 95 that applies the braking force to the left brake disc 94 to apply the braking force to the left front wheel 31.

As shown in FIG. 9B, the condition (A) preferably includes a structure that, when looking at the vehicle 1 from the front thereof, the right wheel speed sensor is disposed closer to the right brake disc than a center line of the right front inner tube.

The condition (B) preferably includes a structure that, when looking at the vehicle 1 from the front thereof, the left wheel speed sensor 40 is disposed closer to the left brake disc 94 than a center line of the left front inner tube 334 (the left extending and contracting axis c).

In the illustrated example, the left extending and contracting axis c is described as being a center line that passes a center of the left front inner tube 334. A left end portion of the left wheel speed sensor 40 is disposed closer to the left brake disc 94 than the left extending and contracting axis c of the left front inner tube 334.

According to the configuration described above, it becomes difficult for stones that are caught and thrown from the front by the left front wheel 31 to intrude in the space between the left front inner tube 334 and the left brake disc 94. This makes it easy to protect the left wheel speed sensor 40 from stones that re caught and thrown from the front.

According to a preferred embodiment of the present invention, the vehicle 1 preferably includes the right brake including the right brake disc that rotates together with the right front wheel and the right brake caliper that applies a braking force to the right brake disc to apply a braking force to the right front wheel; and the left brake 90 including the left brake disc 94 that rotates together with the left front wheel 31 and the left brake caliper 95 that applies the braking force to the left brake disc 94 to apply the braking force to the left front wheel 31.

The condition (A) preferably includes a structure that, when looking at the vehicle 1 from the front thereof, at least a portion of the right sensor wire is disposed closer to the right brake disc than a center line of the right front inner tube.

As shown in FIG. 9A, the condition (B) preferably includes a structure that at least a portion of the left sensor wire 84 is disposed closer to the left brake disc 94 than the center line of the left front inner tube 334 when looking at the vehicle 1 from the front thereof.

In the illustrated example, the portion of the left sensor wire 84 that passes between the left front outer tube 333 and the left brake disc 94 is disposed closer to the left brake disc 94 than the center line of the left front inner tube 334.

According to the configuration described above, it becomes difficult for stones that are caught and thrown from the front by the left front wheel 31 to intrude in the space between the left front inner tube 334 and the left brake disc 94. This makes it easy to protect the left sensor wire 84 from stones that are caught and thrown from the front.

According to a preferred embodiment of the present invention, the vehicle 1 preferably includes the right brake including the right brake disc that rotates together with the right front wheel and the right brake caliper that applies a braking force to the right brake disc to apply a braking force to the right front wheel; and the left brake 90 including the left brake disc 94 that rotates together with the left front wheel 31 and the left brake caliper 95 that applies the braking force to the left brake disc 94 to apply the braking force to the left front wheel 31.

The condition (A) preferably includes a structure that, when looking at the vehicle from the direction of the right wheel axis, a right wire take-out port is provided in the right sensor housing of the right wheel speed sensor in a position located inwards of an outer edge of the right brake disc; and a structure that, when looking at the vehicle 1 from the front, at least a portion of the right sensor wire passes a position located closer to the right brake disc than the right wire take-out port to extend upwards.

As shown in FIGS. 9A and 9B, the condition (B) preferably includes a structure that, when looking at the vehicle 1 from the direction of the left wheel axis J, a left wire take-out port 89*d* is provided in the left sensor housing 83 of the left wheel speed sensor 40 in a position located inwards of an outer edge of the left brake disc 94; and a structure that, when looking at the vehicle 1 from the front thereof, at least a portion of the left sensor wire 84 passes a position located closer to the left brake disc 94 than the left wire take-out port 89*d* to extend upwards.

In the illustrated example, as shown in FIG. 9A, as seen from the direction of the left wheel axis J, the left wire take-out port 89*d* is provided in the left sensor housing 83 of the left wheel speed sensor 40 in the position located inwards of the outer edge of the left brake disc 94. In addition, as shown in FIG. 9B, when looking at the vehicle 1 from the front thereof, the portion of the left sensor wire 84 that passes between the left front outer tube 333 and the left brake disc 94 passes the position located closer to the left brake disc 94 than the left wire take-out port 89*d* to extend upwards.

The left wheel speed sensor 40 includes the left wheel speed detector 82 that preferably includes a Hall device, a circuit board that amplifies an electric signal outputted from the left wheel speed detector 82, a terminal portion, the left wire take-out port 89*d*, and the sensor housing 83. The left wheel speed detector 82 is connected mechanically and electrically to the circuit board. The terminal portion is connected electrically to the circuit board. The left sensor wire 84 is preferably soldered to the terminal portion. An electric signal outputted from the left wheel speed detector 82 is amplified at the circuit board and is then transmitted to the left sensor wire 84 via the terminal portion.

The left wheel speed detector 82, the circuit board, the terminal portion, and the left wire take-out port 89*d* are disposed sequentially in this order in direction in which they are spaced away from the left disc brake 94. Due to this, a distance of some extent is provided between the left wheel speed detector 82 and the left wire take-out port 89*d* in relation to the direction of the left wheel axis J, and the left wheel speed sensor 40 has a size of some extent in the direction of the left wheel axis J. In this way, in the left wheel speed sensor 40, there exists a space where the left wheel speed detector 82 is provided on a side thereof located farther away from the left disc brake 94 than the left wire take-out portion 89*d*.

Then, in the present preferred embodiment, the left sensor wire 84 that extends from the left wire take-out port 89*d* is able to pass close to the left brake disc 94 to extend upwards by using the space where the left wheel speed detector 82 is provided. This prevents the interference of the left sensor wire 84 with the left front outer tube 333 or the left rear outer tube 335 by using the originally existing space without enlarging the size of the vehicle 1.

The layout of the left wheel speed sensor 40, the left sensor wire 84, the right wheel speed sensor, and the right sensor wire is not limited to the layout described in the preferred embodiments described above. The layout of those constituent members described above is not limited, as long as at least one of the condition (A) and the condition (B) is satisfied.

FIGS. 10 to 15 are views showing left shock absorbers of vehicles according to second to seventh preferred embodiments of the present invention, respectively. Vehicles according to the second to seventh preferred embodiments differ from the vehicle 1 of the first preferred embodiment in the layout of a left wheel speed sensor, a left sensor wire, a right wheel speed sensor, and a right sensor wire. Due to this, only features of vehicles according to the second to seventh preferred embodiments that are different from the first preferred embodiment will be described below.

Second Preferred Embodiment

Figure 10:
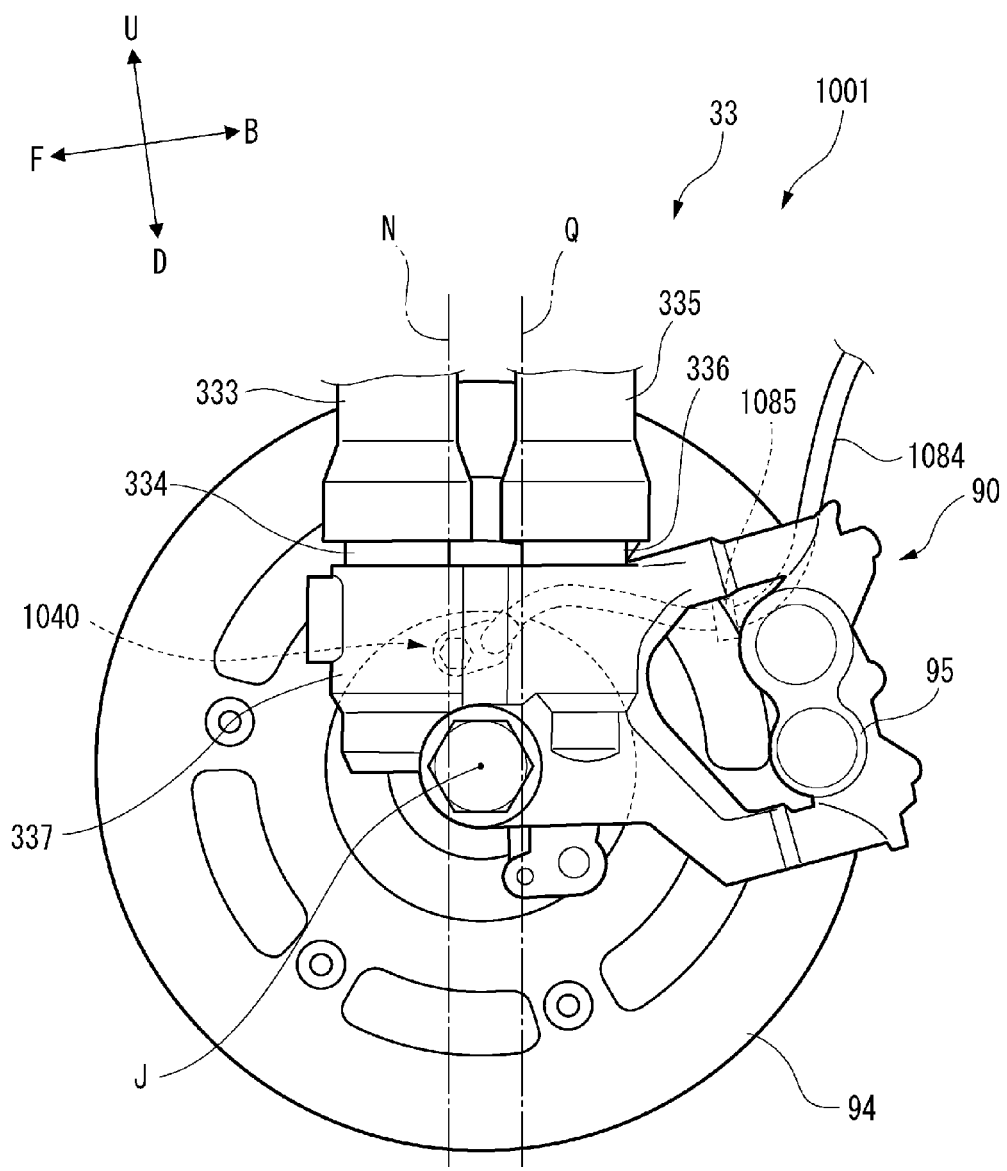
FIG. 10 is a view showing a left shock absorber of a vehicle according to a second preferred embodiment of the present invention.

FIG. 10 is a view showing a left shock absorber 33 of a vehicle 1001 according to the second preferred embodiment of the present invention. FIG. 10 shows the left shock absorber 33 that is compressed to its maximum extent. FIG. 10 is a front view of the left shock absorber 33 of the vehicle 1001 that is not steered at all.

The state in which the left shock absorber 33 is compressed to its maximum extent means a state in which an upward load is inputted from a road surface into a left front wheel 31, such that a left front inner tube 334 is inserted into a left front outer tube 333 to its maximum extent and a left rear inner tube 336 is inserted into a left rear outer tube 335 to its maximum extent. Even though an upward load is inputted farther from the road surface into the left front wheel 31 from that maximum compressed state, a distance over which an upper end of a left inner connector 337 is spaced away from a lower end of the left front outer tube 333 and a distance over which the upper end of the left inner connector 337 is spaced away from a lower end of a left rear outer tube 335 are not contracted any more.

In the illustrated example, a left lower restrictor 1085 is disposed behind a left rear imaginary line Q and is fixed to the left inner connector 337.

In the present preferred embodiment, a condition (A) preferably includes a structure that, when looking at the vehicle from the direction of a right wheel axis, a right sensor wire crosses a right front imaginary line or a right rear imaginary line below either of a lower end of a right front outer tube and a lower end of a right rear outer tube which is lower than the other of the lower end of a right front outer tube and the lower end of a right rear outer tube when a right shock absorber is compressed to its maximum extent.

As shown in FIG. 10, a condition (B) preferably includes a structure that, when looking at the vehicle from the direction of a left wheel axis J, a left sensor wire 1084 crosses a left front imaginary line N or a left rear imaginary line Q below either of a lower end of the left front outer tube 333 and a lower end of the left rear outer tube 335 which is lower than the other of the lower end of the left front outer tube 333 and the lower end of the left rear outer tube 335 when the left shock absorber 33 is compressed to its maximum extent. In the illustrated example, a portion of the left sensor wire 1084 that is located between a left wheel speed sensor 1040 and the left lower restrictor 1085 crosses the left rear imaginary line Q.

According to the configuration described above, in such a state that the left shock absorber 33 is compressed to its maximum extent, neither the left front outer tube 333 nor the left rear outer tube 335 is displaced downwards any farther. In the event that the left sensor wire 1084 crosses the left front imaginary line N or the left rear imaginary line Q below either of the lower end of the left front outer tube 333 and the lower end of the left rear outer tube 335 which is lower than the other of the lower end of the left front outer tube 333 and the lower end of the left rear outer tube 335 in such a state that the left shock absorber 33 is compressed to its maximum extent, the left sensor wire 1084 does not interfere with the left front outer tube 333 and the left rear outer tube 335. The interference of the left sensor wire 1084 with the left front outer tube 333 and the left rear outer tube 335 is avoided easily.

In the present preferred embodiment, the vehicle 1001 preferably includes a right brake including a right brake disc that rotates together with a right front wheel and a right brake caliper that applies a braking force to the right brake disc to apply a braking force to the right front wheel; and a left brake 90 including a left brake disc 94 that rotates together with a left front wheel 31 and a left brake caliper 95 that applies a braking force to the left brake disc 94 to apply a braking force to the left front wheel 31.

The condition (A) preferably includes a structure that a right lower restrictor is disposed inwards of an outer edge of a right brake disc as seen from the direction of a left wheel axis.

As shown in FIG. 10, the condition (B) preferably includes a structure that the left lower restrictor 1085 is disposed inwards of the outer edge of the left brake disc 94 when looking at the vehicle from the direction of the left wheel axis J.

According to the configuration described above, a portion of the left sensor wire 1084 extending from the left wheel speed sensor 1040 to the left lower restrictor 1085 which is prevented from being deformed is provided inwards of the outer edge of the left brake disc 94 of the left front wheel 31 when looking at the vehicle from the direction of the left wheel axis J. In this way, the left lower restrictor 1085 prevents the deformation of the left sensor wire 1084 in the position located closer the left wheel speed sensor 1040, such that the left sensor wire 1084 is held in a stable manner.

Third Preferred Embodiment

Figure 11:
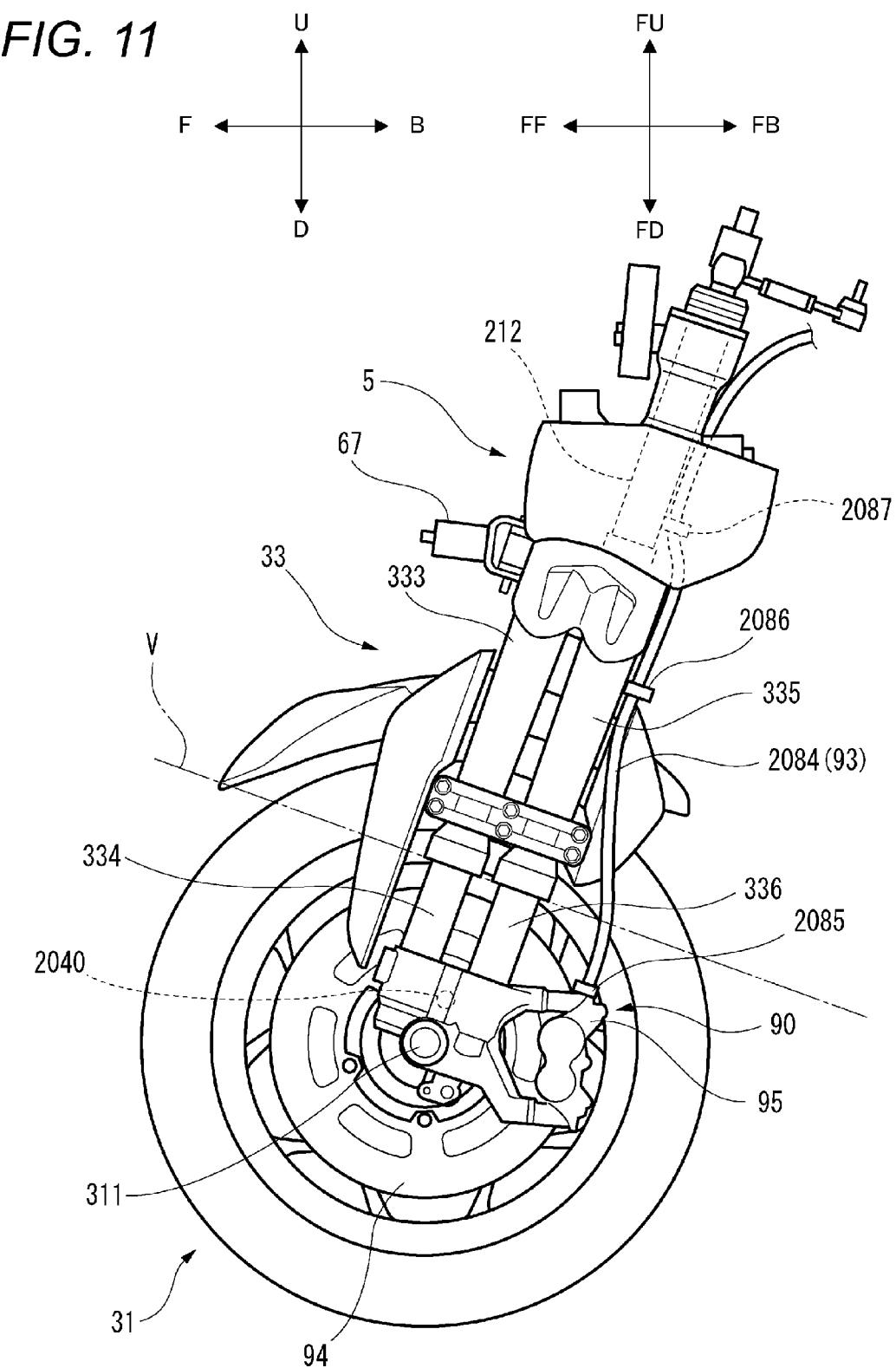
FIG. 11 is a view showing a left shock absorber of a vehicle according to a third preferred embodiment of the present invention.

FIG. 11 is a view showing a left shock absorber 33 of a vehicle 2001 according to a third preferred embodiment of the present invention. FIG. 11 shows the left shock absorber 33 and a portion of a linkage 5 of the vehicle 2001 that is not steered at all.

A left sensor wire 2084 is prevented from being deformed by a left middle restrictor 2086 and a left upper restrictor 2087 in addition to a left lower restrictor 2085. The left middle restrictor 2086 and the left upper restrictor 2087 preferably include, for example, a clip that holds the left sensor wire 2084, a tube member through which the left sensor wire 2084 is passed or a band member that extends across the left sensor wire 2084. The left lower restrictor 2085, the left middle restrictor 2086, and the left upper restrictor 2087 may include members that are different from one another. For example, the left lower restrictor 2085 may include a clip, the left middle restrictor 2086 may include a tube member, and the left upper restrictor 2087 may include a band member.

The left middle restrictor 2086 restricts or prevents the deformation of the left sensor wire 2084 in a position along the length of the left sensor wire 2084 that is located upstream of the left lower restrictor 2085. The left middle restrictor 2086 is fixed to a left rear outer tube 335.

The left upper restrictor 2087 restricts or prevents the deformation of the left sensor wire 2084 in a position along the length of the left sensor wire 2084 that is located upstream of the left middle restrictor 2086. The left upper restrictor 2087 is fixed to a link support 212.

A left brake hose 93 extends upwards from a left brake caliper 95. The left sensor wire 2084 is restricted or prevented from being displaced together with the left brake hose 93 at the left middle restrictor 2086. The left middle restrictor 2086 is provided on the left brake hose 93. The left middle restrictor 2086 is fixed to the left rear outer tube 335.

In the present preferred embodiment, the vehicle 2001 preferably includes a right brake including a right brake disc that rotates together with a right front wheel and a right brake caliper that applies a braking force to the right brake disc to apply a braking force to the right front wheel; and a left brake 90 including a left brake disc 94 that rotates together with a left front wheel 31 and the left brake caliper 95 that applies a braking force to the left brake disc 94 to apply a braking force to the left front wheel 31.

A condition (A) preferably includes a structure that, when looking at the vehicle from the direction of a right wheel axis, a right sensor wire is restricted or prevented from being displaced together with a right brake hose that extends upwards from a right brake caliper by a right middle restrictor above a right lower imaginary line that connects a rear lower end of a right front outer tube and a front lower end of a right rear outer tube in such a state that a right shock absorber extends to its maximum extent.

As shown in FIG. 11, a condition (B) preferably includes a structure that, when looking at the vehicle from the direction of a left wheel axis J, the left sensor wire 2084 is restricted or prevented from being deformed together with the left brake hose 93 that extends upwards from the left brake caliper 95 by the left middle restrictor 2086 above a left lower imaginary line V that connects a rear lower end of a left front outer tube 333 and a front lower end of a left rear outer tube 335 in such a state that the left shock absorber 33 extends to its maximum extent.

According to the configuration described above, the left sensor wire 2084 is laid out by using the highly rigid left brake hose 93 since the left sensor wire 2084 is restricted or prevented from being deformed together with the left brake hose 93 by the left middle restrictor 2086. Since the left sensor wire 2084 and the left brake hose 93 are restrained together, the number of parts is reduced. A space where the left sensor wire 2084 is laid out and a space where the left brake hose 93 is laid out do not have to be provided separately, such that the left sensor wire 2084 and the left brake hose 93 are laid out together within a small space.

In the present preferred embodiment, the vehicle 2001 preferably includes the right brake including the right brake disc that rotates together with the right front wheel and the right brake caliper that applies a braking force to the right brake disc to apply a braking force to the right front wheel; and the left brake 90 including the left brake disc 94 that rotates together with the left front wheel 31 and the left brake caliper 95 that applies a braking force to the left brake disc 94 to apply a braking force to the left front wheel 31.

The condition (A) preferably includes a structure that, when looking at the vehicle from the direction of the right wheel axis, the right sensor wire is restricted or prevented from being displaced by the right middle restrictor that is provided on the right brake hose that extends upwards from the right brake caliper above the right lower imaginary line.

As shown in FIG. 11, the condition (B) preferably includes a structure that, when looking at the vehicle from the direction of the left wheel axis J, the left sensor wire 2084 is restricted or prevented from being deformed by the left middle restrictor 2086 that is provided on the left brake hose 93 that extends upwards from the left brake caliper 95 above the left lower imaginary line V.

According to the configuration described above, the left sensor wire 2984 is laid out by providing the left middle restrictor 2086 on the highly rigid left brake hose 93. Since the left sensor wire 2084 and the left brake hose 93 are able to be restrained together, the number of parts is reduced. A space where the left sensor wire 2084 is laid out and a space where the left brake hose 93 is laid out do not have to be provided separately, such that the left sensor wire 2084 and the left brake hose 93 are able to be laid out together within a small space.

In the present preferred embodiment, the condition (A) preferably includes a structure that the right sensor wire is restricted or prevented from being deformed by a right lower restrictor, the right middle restrictor that is provided upstream of the right lower restrictor, and a right upper restrictor that is provided upstream of the right middle restrictor; a structure that the right middle restrictor is fixed to the right front outer tube, the right rear outer tube, or a member that is displaced together with the right front outer tube and the right rear outer tube; and a structure that the right upper restrictor is fixed to a body frame 21.

As shown in FIG. 11, the condition (B) preferably includes a structure that the left sensor wire 2084 is restricted or prevented from being deformed by the left lower restrictor 2085, the left middle restrictor 2086 that is provided upstream of the left lower restrictor 2085, and the left upper restrictor 2087 that is provided upstream of the left middle restrictor 2086; a structure that the left middle restrictor 2086 is fixed to the left front outer tube 333, the left rear outer tube 335, or a member that is displaced together with the left front outer tube 333 and the left rear outer tube 335; and a structure that the left upper restrictor 2087 is fixed to the body frame 21.

According to the configuration described above, the left sensor wire 2084 permits a change in distance between the ECU and the left wheel speed sensor 2040 that occurs in association with the operation of the left shock absorbing drive 33 by the portion that is located between the left lower restrictor 2085 and the left middle restrictor 2086 being deformed. The left sensor wire 2084 permits a change in distance between the ECU and the left wheel speed sensor 2040 that occurs in association with the leaning operation of the vehicle 2001 and a change in distance between the ECU and the left wheel speed sensor 2040 that occurs in association with the steering operation of the vehicle 2001 by the portion between the left middle restrictor 2086 and the left upper restrictor 2087 being deformed. Since the left sensor wire 2084 is deformed in the predetermined manner at the predetermined locations, large spaces do not have to be secured individually for the deformations of the portions of the left sensor wire 2084, such that the vehicle 2001 is compact in size.

In the present preferred embodiment, while the left sensor wire 2084 is described as being not clamped between the left middle restrictor 2086 and the left upper restrictor 2087, the left sensor wire 2084 may be restricted or prevented from being deformed by a further restrictor between the left middle restrictor 2086 and the left upper restrictor 2087. For example, a left first restrictor may be provided on a tie-rod 67. By doing so, the deformation of the left sensor wire 2084 that occurs in association with the steering operation of the vehicle 2001 is mainly permitted by the portion located between the left middle restrictor 2086 and the left first restrictor, the deformation of the left sensor wire 2084 that occurs in association with the leaning operation of the vehicle 2001 is mainly permitted by the left first restrictor and the left upper restrictor 2087.

Fourth Preferred Embodiment

Figure 12:
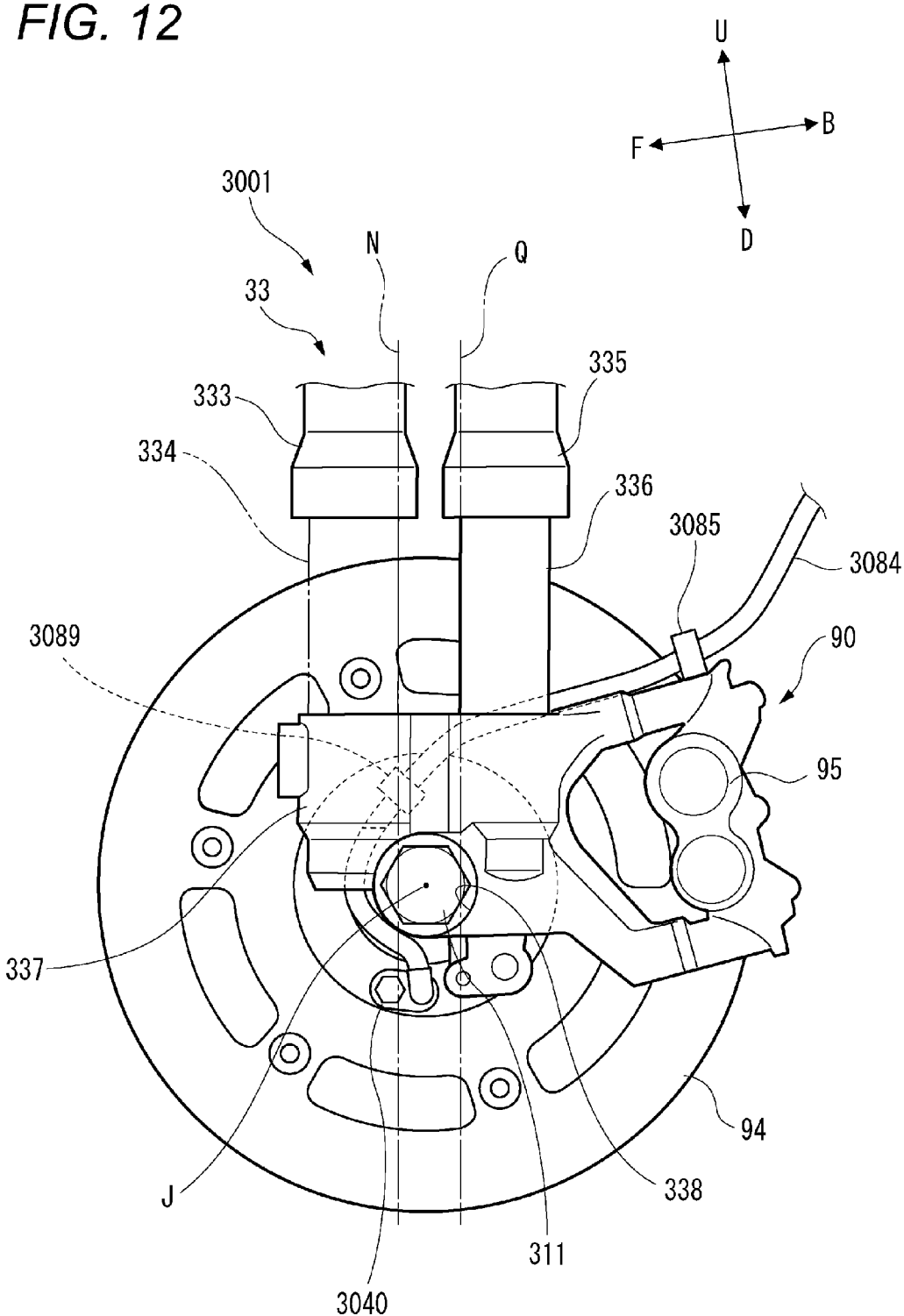
FIG. 12 is a view showing a left shock absorber of a vehicle according to a fourth preferred embodiment of the present invention.

FIG. 12 is a view showing a left shock absorber 33 of a vehicle 3001 according to a fourth preferred embodiment of the present invention.

In the first preferred embodiment described above, the left wheel speed sensor 40 is described as being provided above the left wheel axis J. However, as shown in FIG. 12, a left wheel speed sensor 3040 may be provided below a left wheel axis J. At least a portion of the left wheel speed sensor 3040 is provided behind a left front imaginary line N and ahead of a left rear imaginary line Q below the left wheel axis J.

In the present preferred embodiment, a left lower restrictor 3085 is fixed to a left brake caliper 95. The left lower restrictor 3085 is provided behind the left rear imaginary line Q. A left second restrictor 3089 is fixed to a left inner connector 337 above a left axle support 338.

The left sensor wire 3084 extends upwards from the left wheel speed sensor 3040. The left sensor wire 3084 passes between a left front inner tube 334 and a left axle member 311. The left sensor wire 3084 crosses the left rear imaginary line Q below a lower end of a left front outer tube 333 and a lower end of a left rear outer tube 335 when the left shock absorber 33 extends to its maximum extent.

The left wheel speed sensor 3040, the left second restrictor 3089, and the left lower restrictor 3085 are all provided on a left inner connector 337. Due to this, a portion of the left sensor wire 3084 that extends from the left wheel speed sensor 3040 to the left second restrictor 3089 and a portion of the left sensor wire 3084 that extends from the left second restrictor 3089 to the left lower restrictor 3085 are prevented from being deformed even though the left shock absorber 33 is operated. Due to this, in the present preferred embodiment, too, the left sensor wire 3084 is laid out even in an area where interference would appear to easily occur, thus the degree of freedom in laying out the left sensor wire 3084 is enhanced.

Fifth Preferred Embodiment

Figure 13:
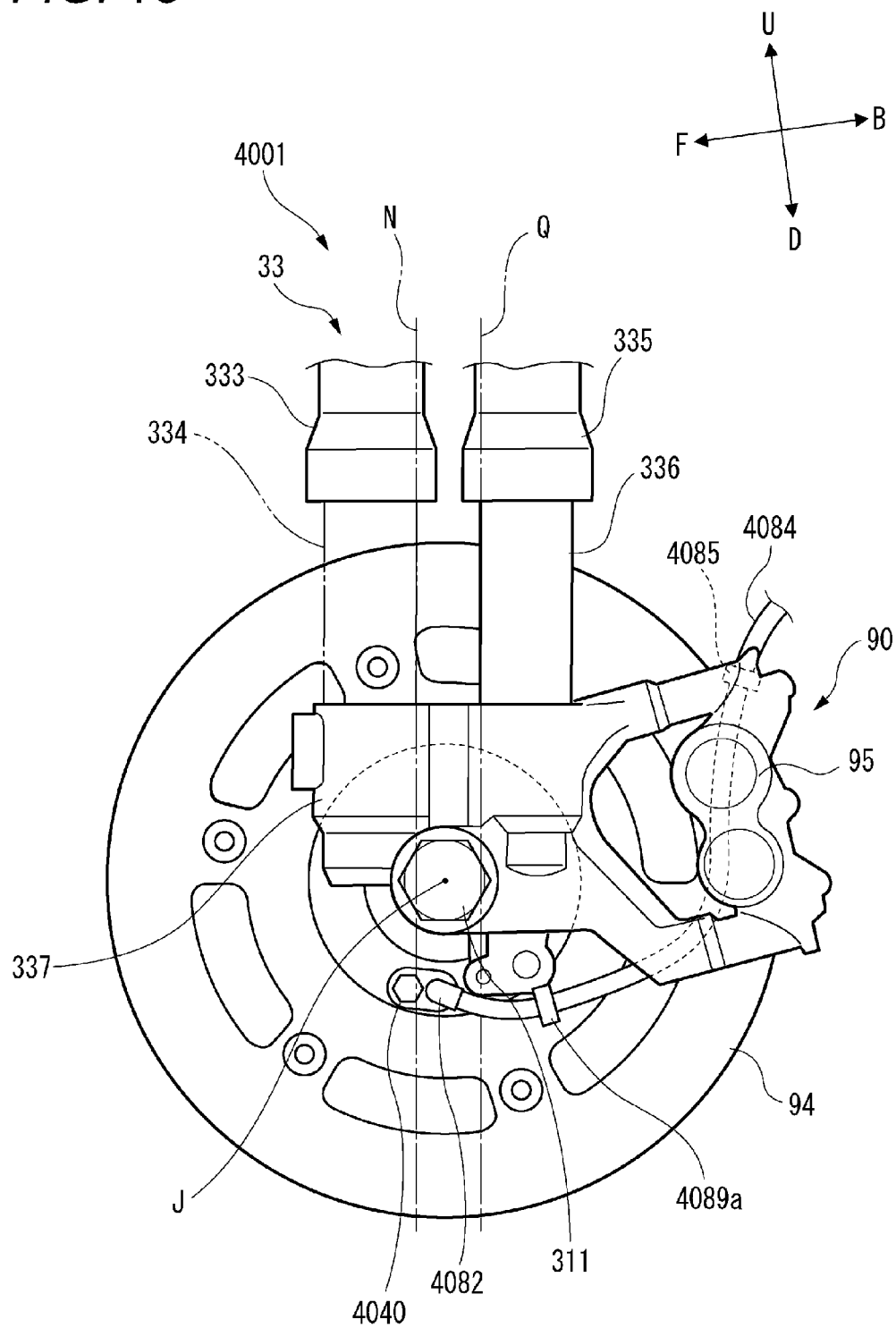
FIG. 13 is a view showing a left shock absorber of a vehicle according to a fifth preferred embodiment of the present invention.

FIG. 13 is a view showing a left shock absorber 33 of a vehicle 4001 according to a fifth preferred embodiment of the invention.

In the fourth preferred embodiment, the left sensor wire 3084 is described as extending upwards from the left wheel speed sensor 3040. However, the present invention is not limited thereto. As shown in FIG. 13, a left sensor wire 4084 may extend downwards from a left wheel speed sensor 4040.

In the present preferred embodiment, a left third restrictor 4089*a* is provided on a left inner connector 337 behind a left rear imaginary line Q. The left sensor wire 4084 extends from the left wheel speed sensor 4040 and passes the left third restrictor 4089*a* and a left lower restrictor 4085.

The left sensor wire 4084 extends downwards and rearwards from the left wheel speed sensor 4040. A portion of the left sensor wire 4084 that extends from the left wheel speed sensor 4040 to the left third restrictor 4089*a* crosses the left rear imaginary line Q below a lower end of a left front outer tube 333 and a lower end of a left rear outer tube 335 when the left shock absorber 33 extends to its maximum extent. A portion of the left sensor wire 4084 that extends from the left wheel speed sensor 4040 to the left third restrictor 4089*a* passes above a lower end of the left inner connector 337.

The left wheel speed sensor 4040, the left third restrictor 4089*a*, and the left lower restrictor 4085 are all provided on a left brake caliper 95 that displaces relatively together with the left inner connector 337 when the left inner connector 337 or the left shock absorber 33 is operated. Due to this, the portion of the left sensor wire 4084 that extends from the left wheel speed sensor 4040 to the left third restrictor 4089*a* and a portion of the left sensor wire 4084 that extends from the left third restrictor 4089*a* to the left lower restrictor 4085 are prevented from being deformed even though the left shock absorber 33 is operated. Due to this, in the present preferred embodiment, too, the left sensor wire 4084 is laid out even in an area where interference would appear to easily occur, thus the degree of freedom in laying out the left sensor wire 4084 is enhanced.

Sixth Preferred Embodiment

Figure 14:
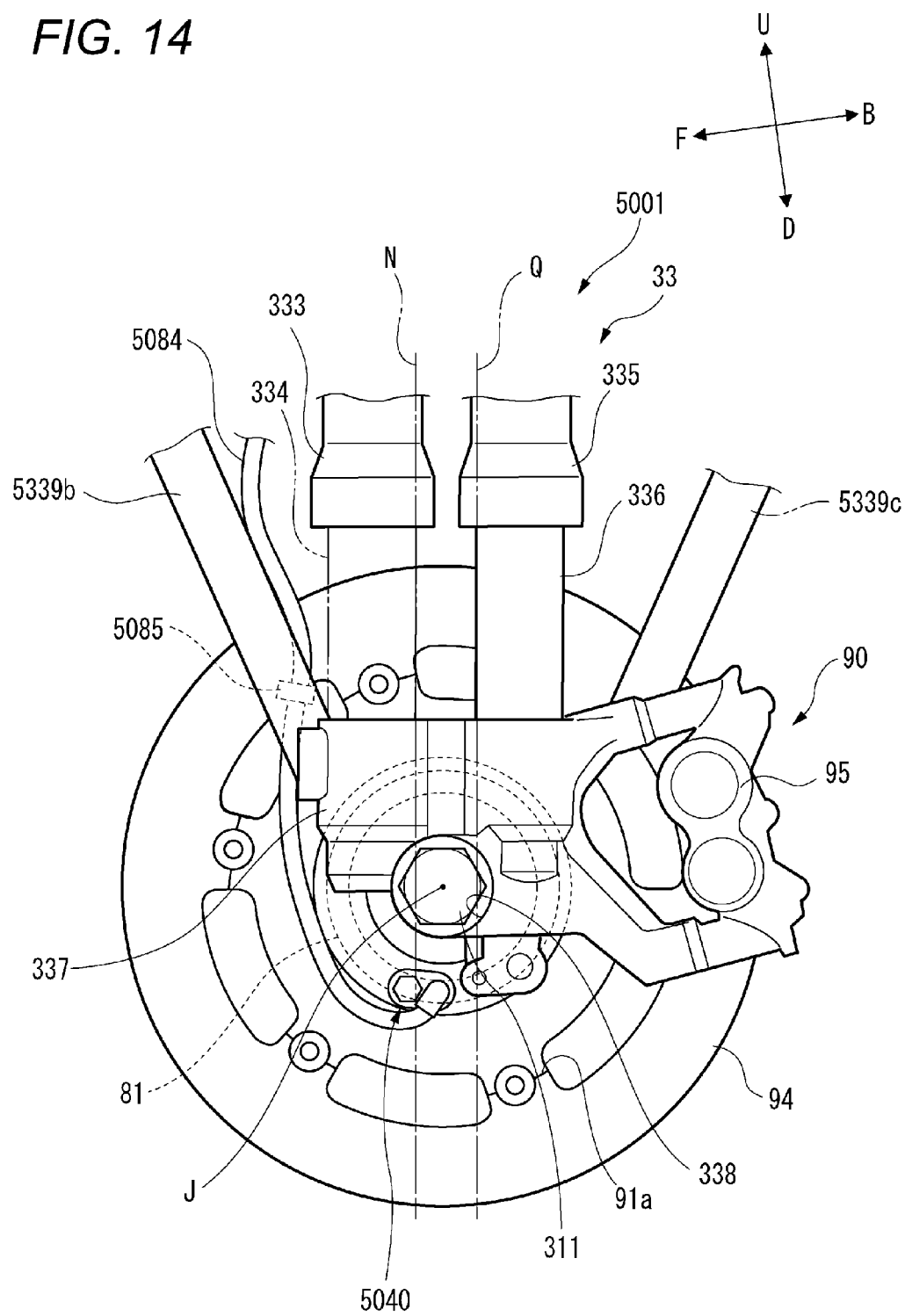
FIG. 14 is a view showing a left shock absorber of a vehicle according to a sixth preferred embodiment of the present invention.

FIG. 14 is a view showing a left shock absorber 33 of a vehicle 5001 according to a sixth preferred embodiment of the present invention.

In the first preferred embodiment described above, the left sensor wire 84 is described as crossing the left rear imaginary line Q. However, the present invention is not limited thereto. As shown in FIG. 14, a left sensor wire 5084 may cross a left front imaginary line N.

In the present preferred embodiment, a left inner connector 337 includes a left mudguard stay that supports a left front mudguard 223 (refer to FIG. 8) that covers an upper portion of a left front wheel 31. The left mudguard stay includes a left front mudguard stay portion 5339*b* that is provided ahead of a left axle member 311 and a rear mudguard stay portion 5339*c* that is provided behind the left axle member 311.

A left lower restrictor 5085 is fixed to the left front mudguard stay portion 5339*b*. In the vehicle 5001 that is standing upright and is not steered at all, when looking at the vehicle from the left of a left wheel axis J, the left lower restrictor 5085 is provided ahead of a left front imaginary line N. The left lower restrictor 5085 is provided above a left wheel speed sensor 5040. The left lower restrictor 5085 is provided above the left axle member 311. The left lower restrictor 5085 is provided outwards of an outer edge of a left encoder 81. The left lower restrictor 5085 is provided outwards of an inner edge 91*a* of a left brake disc 94.

The left wheel speed sensor 5040 is provided on the left inner connector 337 below the left axle member 311. The left sensor wire 5084 extends downwards from the left wheel speed sensor 5040 to pass directly below a left front inner tube 334 and then extends upwards to pass the left lower restrictor 5085. The left sensor wire 5084 crosses the left front imaginary line N below a lower end of a left front outer tube 333 and a lower end of a left rear outer tube 335 when the left shock absorber 33 extends to its maximum extent.

The left wheel speed sensor 5040 and the left lower restrictor 5085 are both provided on the left front mudguard stay portion 5339*b* that is displaced relatively together with the left inner connector 337 when the left inner connector 337 or the left shock absorber 33 is operated. Due to this, even though the left shock absorber 33 is operated, a portion of the left sensor wire 5084 that extends from the left wheel speed sensor 5040 to the left lower restrictor 5085 is prevented from being deformed. Due to this, in the present preferred embodiment, too, the left sensor wire 5084 is laid out even in an area where interference would appear to easily occur, thus the degree of freedom in laying out the left sensor wire 5084 is enhanced.

Seventh Preferred Embodiment

Figure 15:
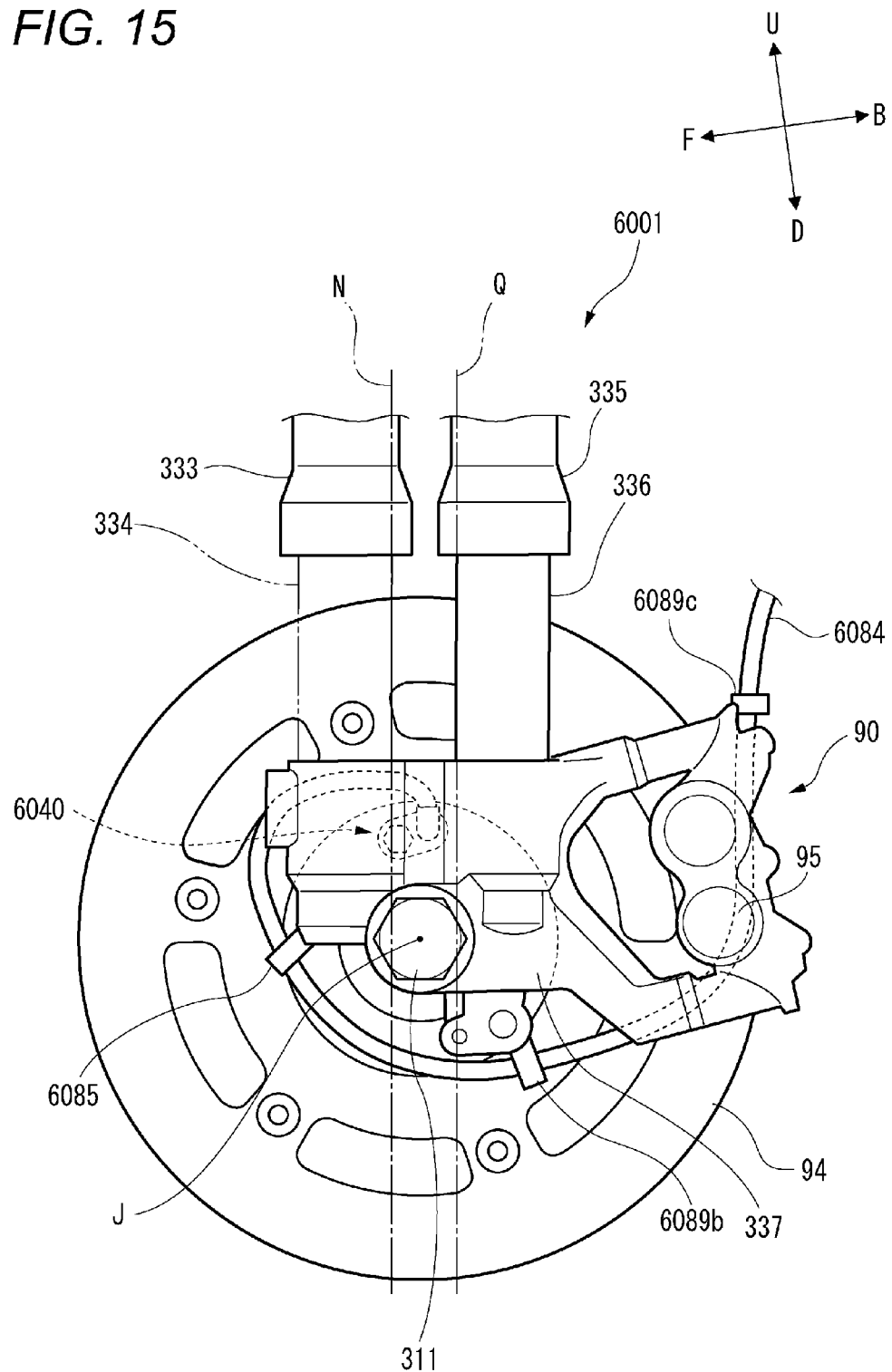
FIG. 15 is a view showing a left shock absorber of a vehicle according to a seventh preferred embodiment of the present invention.

FIG. 15 is a view showing a left shock absorber 33 of a vehicle 6001 according to a seventh preferred embodiment of the present invention.

In the present preferred embodiment, a left wheel speed sensor 6040 is provided on a left inner connector 337 above a left axle member 311. A left lower restrictor 6085 is provided at a front portion of a lower portion of the left inner connector 337 in a position located ahead of a left front imaginary line N. A left fourth restrictor 6089*b* is provided at a rear portion of the lower portion of the left inner connector 337. A left fifth restrictor 6089*c* is provided on a left brake caliper 95.

In the present preferred embodiment, a left sensor wire 6084 extends upwards and forwards from the left wheel speed sensor 6040 and crosses a left front imaginary line N from the rear to the front. Further, the left sensor wire 6084 passes ahead of the left inner connector 337 and then passes the left lower restrictor 6085. Further, the left sensor wire 6084 crosses below a left front inner tube 334 from the front to the rear and passes the left fourth restrictor 6089*b*. Further, the left sensor wire 6084 extends upwards from the left fourth restrictor 6089*b*, passes the left fifth restrictor 6089*c*, and extends upwards.

A portion of the left sensor wire 6084 that is located between the left wheel speed sensor 6040 and the left lower restrictor 6085 crosses the left front imaginary line N below a lower end of a left front outer tube 333 and a lower end of a left rear outer tube 335 when the left shock absorber 33 extends to its maximum extent from the rear to the front.

The left wheel speed sensor 6040 and the left lower restrictor 6085 are both provided on the left inner connector 337. Due to this, even though the left shock absorber 33 is operated, a portion of the left sensor wire 6084 that extends from the left wheel speed sensor 6040 to the left lower restrictor 6085 is prevented from being deformed. Due to this, in the present preferred embodiment, too, the left sensor wire 6084 is laid out even in an area where interference would appear to easily occur, thus the degree of freedom in laying out the left sensor wire 6084 is enhanced.

In preferred embodiments described above, while the left shock absorber 33 is described as being positioned on the left side of the left front wheel 31, and the right shock absorber 34 is described as being positioned on the right side of the right front wheel 32, the present invention is not limited thereto. The left shock absorber 33 may be positioned on the right side of the left front wheel 31, and the right shock absorber 34 may be positioned on the left side of the right front wheel 32.

In the preferred embodiments described above, while the engine unit 25 is described as preferably supporting the rear wheel 4 so as to oscillate, the present invention is not limited thereto. The engine unit and the rear wheel may be both supported on the body frame so as to rotate or pivot.

In the above preferred embodiments, the vehicle 1 includes a single rear wheel 4. However, the vehicle 1 may include a plurality of rear wheels.

In the preferred embodiments described above, the center of the rear wheel 4 in the left-and-right direction of the body frame 21 preferably coincides with the center of the space defined between the left front wheel 31 and the right front wheel 32 in the left-and-right direction of the body frame 21. Although the configuration described above is preferable, the center of the rear wheel 4 in the left-and-right direction of the body frame 21 does not have to coincide with the center of the space defined between the left front wheel 31 and the right front wheel 32 in the left-and-right direction of the body frame 21.

In the preferred embodiments described above, the linkage 5 preferably includes the upper cross member 51 and the lower cross member 52. However, the linkage 5 preferably includes a cross member other than the upper cross member 51 and the lower cross member 52. The "upper cross member" and the "lower cross member" are merely so called based on their relative positions in relation to the up-and-down direction. The upper cross member does not mean an uppermost cross member in the linkage 5. The upper cross member means a cross member that is located above another cross member that is located therebelow. The lower cross member does not mean a lowermost cross member in the linkage 5. The lower cross member means a cross member that is located below another cross member that is located thereabove. At least one of the upper cross member 51 and the lower cross member 52 may include two members such as a right cross member and a left cross member. In this way, the upper cross member 51 and the lower cross member 52 may include a plurality of cross members as long as they maintain the link function.

In the preferred embodiments described above, the linkage 5 defines the parallel four joint link system. However, the linkage 5 may use a double wishbone configuration.

When used in this description, the word "parallel" means that it also includes two straight lines which do not intersect each other as members while they are inclined at an angle falling within the range of ±40 degrees. When used in this description to describe a direction or a member, the expression reading "something extends along a certain direction or member" means that it includes a case where something inclines at an angle falling within the range of about ±40 degrees relative to the certain direction or member, for example. When used in this description, the expression reading "something extends in a direction" means that it includes a case where something extends in the direction while being inclined at an angle falling within the range of about ±40 degrees relative to the direction, for example.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

The present invention can be embodied in many different forms. This description should be understood to provide preferred embodiments of the present invention. The preferred embodiments which are at least described or illustrated in this description are so described or illustrated based on the understanding that the preferred embodiments are not intended to limit the present invention.

The present invention includes every preferred embodiment which includes an equivalent element, a modification, a deletion, a combination (for example, a combination of characteristics that are described commonly in various embodiments), an improvement and an alteration which can be recognized by those skilled in the art to which the present invention pertains based on the preferred embodiments disclosed in this description. The limitative matters of claims should be construed broadly based on terms used in the claims and hence should not be limited by the preferred embodiments described in this description or the prosecution of this patent application. The preferred embodiments should be construed as non-exclusive. For example, in this description, the terms "preferable or preferably" and "may" should be construed as being non-exclusive, and those terms mean, respectively, that it is "preferable but not limited thereto" and that it "may be acceptable but not limited thereto."

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising: a body frame that is able to lean to a right of the vehicle when the vehicle turns right and lean to a left of the vehicle when the vehicle turns left;
a right front wheel that rotates about a right wheel axis;
a left front wheel provided on a left of the right front wheel in relation to a left-and-right direction of the body frame and that rotates about a left wheel axis;
a right shock absorber that supports the right front wheel at a lower portion thereof so as to enable the right front wheel to be displaced relatively upwards;
a left shock absorber that supports the left front wheel at a lower portion thereof so as to enable the left front wheel to be displaced relatively upwards; and
a linkage provided on the body frame so as to turn and which supports an upper portion of the right shock absorber at a right portion thereof and supports an upper portion of the left shock absorber at a left portion thereof so as to enable the right front wheel and the left front wheel to be displaced relatively in relation to an up-and-down direction of the body frame; wherein
the right shock absorber includes:
a right front telescopic element including a right front outer tube that extends in a direction of a right extending and contracting axis that extends in the up-and-down direction of the body frame and a right front inner tube that is inserted into the right front outer tube and which extends in the direction of the right extending and contracting axis so that a lower end portion thereof is provided below a lower end portion of the right front outer tube;
a right rear telescopic element including a right rear outer tube that is provided behind the right front outer tube in relation to a front-and-rear direction of the body frame and which extends in the direction of the right extending and contracting axis and a right rear inner tube that is inserted into the right rear outer tube and which extends in the direction of the right extending and contracting axis so that a lower end portion thereof is provided below a lower end portion of the right rear outer tube; and
a right inner connector that connects a lower portion of the right front inner tube and a lower portion of the right rear inner tube together;
the left shock absorber includes:
a left front telescopic element including a left front outer tube that extends in a direction of a left extending and contracting axis that extends in the up-and-down direction of the body frame and a left front inner tube that is inserted into the left front outer tube and which extends in the direction of the left extending and contracting axis so that a lower end portion thereof is provided below a lower end portion of the left front outer tube;
a left rear telescopic element including a left rear outer tube that is provided behind the left front outer tube in relation to the front-and-rear direction of the body frame and which extends in the direction of the left extending and contracting axis and a left rear inner tube that is inserted into the left rear outer tube and which extends in the direction of the left extending and contracting axis so that a lower end portion thereof is provided below a lower end portion of the left rear outer tube; and
a left inner connector that connects a lower portion of the left front inner tube and a lower portion of the left rear inner tube together;
at least one of a condition (A) and a condition (B) below is satisfied;
condition (A) includes:
a structure that the vehicle includes:
a right wheel speed sensor including a right wheel speed detector that detects a wheel speed of the right front wheel and a right sensor housing that holds the right wheel speed detector; and
a right lower restrictor that restricts or prevents deformation of a right sensor wire that extends from the right wheel speed sensor to an engine controller provided on the body frame so that the right sensor wire is prevented from coming into contact with at least the right front outer tube and the right rear outer tube when the right shock absorber is operated;
a structure that the right wheel speed sensor is such that, when looking from a front of the vehicle and the vehicle is standing upright and not steered at all, at least a portion of the right wheel speed sensor is disposed closer to the right front wheel than an outer edge of a side of the right front inner tube which is located opposite to the right front wheel in relation to the direction of the right wheel axis, and that when looking at the vehicle from the direction of the right wheel axis, at least a portion of the right wheel speed sensor is between a right front imaginary line that extends along a rear edge of the right front inner tube and a right rear imaginary line that extends along a front edge of the right rear inner tube and is disposed above a lower end of the right shock absorber in relation to an up-and-down direction of the right extending and contacting axis when looking at the vehicle from the direction of the right wheel axis;
a structure that the right sensor wire crosses the right front imaginary line or the right rear imaginary line below either of a lower end of the right front outer tube and a lower end of the right rear outer tube which is located lower than the other of the lower end of the right front outer tube and the lower end of the right rear outer tube when the right shock absorber extends to its maximum extent; and
a structure that, when looking at the vehicle from the direction of the right wheel axis, at least a portion of the right lower restrictor is provided on the right inner connector or a member that is not displaced relative to the right inner connector in a position that is located ahead of the right front imaginary line in relation to the front-and-rear direction of the body frame or a position that is located behind the right rear imaginary line in relation to the front-and-rear direction of the body frame;
condition (B) includes:
a structure that the vehicle includes:
a left wheel speed sensor including a left wheel speed detector that detects a wheel speed of the left front wheel and a left sensor housing that holds the left wheel speed detector; and
a left lower restrictor that restricts or prevents deformation of a left sensor wire that extends from the left wheel speed sensor to the engine controller so that the left sensor wire is prevented from coming into contact with at least the left front outer tube and the left rear outer tube when the left shock absorber is operated;

a structure that the left wheel speed sensor is such that, when looking from a front of the vehicle and the vehicle is standing upright and not steered at all, at least a portion of the left wheel speed sensor is disposed closer to the left front wheel than an outer edge of a side of the left front inner tube which is located opposite to the left front wheel in relation to the direction of the left wheel axis and that when looking at the vehicle from the direction of the left wheel axis, at least a portion of the left wheel speed sensor is between a left front imaginary line that extends along a rear edge of the left front inner tube and a left rear imaginary line that extends along a front edge of the left rear inner tube and is disposed above a lower end of the left shock absorber in relation to an up-and-down direction of the left extending and contacting axis when looking at the vehicle from the direction of the left wheel axis;

a structure that the left sensor wire crosses the left front imaginary line or the left rear imaginary line below either of a lower end of the left front outer tube and a lower end of the left rear outer tube which is located lower than the other of the lower end of the left front outer tube and the lower end of the left rear outer tube when the left shock absorber extends to its maximum extent; and a structure that, when looking at the vehicle from the direction of the left wheel axis, at least a portion of the left lower restrictor is provided on the left inner connector or a member that is not displaced relative to the left inner connector in a position that is located ahead of the left front imaginary line in relation to the front-and-rear direction of the body frame or a position that is located rearward of the left rear imaginary line in relation to the front-and-rear direction of the body frame.

2. The vehicle according to claim 1, wherein
the condition (A) further includes a structure that, when looking at the vehicle from the direction of the right wheel axis, the right sensor wire crosses the right front imaginary line or the right rear imaginary line below either of the lower end of the right front outer tube and the lower end of the right rear outer tube which is located lower than the other of the lower end of the right front outer tube and the lower end of the right rear outer tube when the right shock absorber is compressed to its maximum extent; and wherein
the condition (B) further includes a structure that, when looking at the vehicle from the direction of the left wheel axis, the left sensor wire crosses the left front imaginary line or the left rear imaginary line below either of the lower end of the left front outer tube and the lower end of the left rear outer tube which is located lower than the other of the lower end of the left front outer tube and the lower end of the left rear outer tube when the left shock absorber is compressed to its maximum extent.

3. The vehicle according to claim 1, further comprising:
a right brake including a right brake disc that rotates together with the right front wheel and a right brake caliper that applies a braking force to the right brake disc to apply a braking force to the right front wheel; and
a left brake including a left brake disc that rotates together with the left front wheel and a left brake caliper that applies a braking force to the left brake disc to apply a braking force to the left front wheel; wherein
the condition (A) further includes:
a structure that the right inner connector includes:
a right axle support that rotatably supports a right axle member of the right front wheel; and
a right caliper boss to which the right brake caliper is attached; and
a structure that, when looking at the vehicle from the direction of the right wheel axis, the right lower restrictor is provided on the right caliper boss at least a portion of which is provided ahead of the right front inner tube; or
a structure that, when looking at the vehicle from the direction of the right wheel axis, the right lower restrictor is provided on the right caliper boss at least a portion of which is provided behind the right rear inner tube;
the condition (B) further includes:
a structure that the left inner connector includes:
a left axle support that rotatably supports a left axle member of the left front wheel; and
a left caliper boss to which the left brake caliper is attached; and
a structure that, when looking at the vehicle from the direction of the left wheel axis, the left lower restrictor is provided on the left caliper boss at least a portion of which is provided ahead of the left front inner tube; or
a structure that, when looking
a structure that, when looking at the vehicle from the direction of the left wheel axis, the left lower restrictor is provided on the left caliper boss at least a portion of which is provided behind the left rear inner tube.

4. The vehicle according to claim 1, further comprising:
a right brake including a right brake disc that rotates together with the right front wheel and a right brake caliper that applies a braking force to the right brake disc to apply a braking force to the right front wheel; and
a left brake including a left brake disc that rotates together with the left front wheel and a left brake caliper that applies a braking force to the left brake disc to apply a braking force to the left front wheel; wherein
the condition (A) further includes:
a structure that, when looking at the vehicle from the front and the vehicle is standing upright and not steered at all, the right sensor wire passes between the right brake disc and an outer edge of the side of the right shock absorber that is located opposite to the right brake disc and then upwards; and
the condition (B) includes:
a structure that, when looking at the vehicle from the front and the vehicle is standing upright and not steered at all, the left sensor wire passes between the left brake disc and the outer edge of the side of the left shock absorber that is located opposite to the left brake disc and extends upwards.

5. The vehicle according to claim 1, wherein
the condition (A) further includes a structure that, when looking at the vehicle from the direction of the right wheel axis, the right lower restrictor is disposed farther inwards than an outer edge of a wheel of the right front wheel; and
the condition (B) further includes a structure that, when looking at the vehicle from the direction of the left wheel axis, the left lower restrictor is disposed farther inwards than an outer edge of a wheel of the left front wheel.

6. The vehicle according to claim 1, further comprising:
a right brake including a right brake disc that rotates together with the right front wheel and a right brake caliper that applies a braking force to the right brake disc to apply a braking force to the right front wheel; and
a left brake including a left brake disc that rotates together with the left front wheel and a left brake caliper that applies a braking force to the left brake disc to apply a braking force to the left front wheel; wherein
the condition (A) further includes:
a structure that, when looking at the vehicle from the direction of the right wheel axis, the right sensor wire is restricted or prevented from being displaced by a right middle restrictor together with a right brake hose that extends upwards from the right brake caliper above a right lower imaginary line that connects a rear lower end of the right front outer tube and a front lower end of the right rear outer tube when the right shock absorber extends to its maximum extent;
the condition (B) further includes:
a structure that, when looking at the vehicle from the direction of the left wheel axis, the left sensor wire is restricted or prevented from being displaced by a left middle restrictor together with a left brake hose that extends upwards from the left brake caliper above a left lower imaginary line that connects a rear lower end of the left front outer tube and a front lower end of the left rear outer tube when the left shock absorber extends to its maximum extent.

7. The vehicle according to claim 1, further comprising:
a right brake including a right brake disc that rotates together with the right front wheel and a right brake caliper that applies a braking force to the right brake disc to apply a braking force to the right front wheel; and
a left brake including a left brake disc that rotates together with the left front wheel and a left brake caliper that applies a braking force to the left brake disc to apply a braking force to the left front wheel; wherein
the condition (A) further includes:
a structure that, when looking at the vehicle from the direction of the right wheel axis, the right sensor wire is restricted or prevented from being displaced by a right middle restrictor that is provided on a right brake hose that extends upwards from the right brake caliper above a right lower imaginary line that connects a rear lower end of the right front outer tube and a front lower end of the right rear outer tube when the right shock absorber extends to its maximum extent; and
the condition (B) further includes:
a structure that, when looking at the vehicle from the direction of the left wheel axis, the left sensor wire is restricted or prevented from being displaced by a left middle restrictor that is provided on a left brake hose that extends upwards from the left brake caliper above a left lower imaginary line that connects a rear lower end of the left front outer tube and a front lower end of the left rear outer tube when the left shock absorber extends to its maximum extent.

8. The vehicle according to claim 1, further comprising:
a right brake including a right brake disc that rotates together with the right front wheel and a right brake caliper that applies a braking force to the right brake disc to apply a braking force to the right front wheel; and
a left brake including a left brake disc that rotates together with the left front wheel and a left brake caliper that applies a braking force to the left brake disc to apply a braking force to the left front wheel; wherein
the condition (A) further includes:
a structure that, when looking at the vehicle from the right wheel axis, the right lower restrictor is disposed farther inwards than an outer edge of the right brake disc; and
the condition (B) further includes:
a structure that, when looking at the vehicle from the left wheel axis, the left lower restrictor is disposed farther inwards than an outer edge of the left brake disc.

9. The vehicle according to claim 1, wherein
the condition (A) further includes:
a structure that the right sensor wire is restricted or prevented from being deformed by the right lower restrictor, a right middle restrictor that is provided upstream of the right lower restrictor, and a right upper restrictor that is provided upstream of the right middle restrictor;
a structure that the right middle restrictor is fixed to the right front outer tube, the right rear outer tube, or a member that is displaced together with the right front outer tube and the right rear outer tube; and
a structure that the right upper restrictor is fixed to the body frame;
the condition (B) further includes:
a structure that the left sensor wire is restricted or prevented from being deformed by the left lower restrictor, a left middle restrictor that is provided upstream of the left lower restrictor, and a left upper restrictor that is provided upstream of the left middle restrictor;
a structure that the left middle restrictor is fixed to the left front outer tube, the left rear outer tube, or a member that is displaced together with the left front outer tube and the left rear outer tube; and
a structure that the left upper restrictor is fixed to the body frame.

10. The vehicle according to claim 1, wherein
the condition (A) further includes a structure that, when looking at the vehicle from the direction of the right wheel axis, the right wheel speed sensor is disposed above a right axle member; and
the condition (B) further includes a structure that, when looking at the vehicle from the direction of the left wheel axis, the left wheel speed sensor is disposed above a left axle member.

11. The vehicle according to claim 1, further comprising:
a right brake including a right brake disc that rotates together with the right front wheel and a right brake caliper that applies a braking force to the right brake disc to apply a braking force to the right front wheel; and
a left brake including a left brake disc that rotates together with the left front wheel and a left brake caliper that applies a braking force to the left brake disc to apply a braking force to the left front wheel; wherein
the condition (A) further includes:
a structure that, when looking at the vehicle from the front, the right wheel speed sensor is disposed closer to the right brake disc than a center line of the right front inner tube; and
the condition (B) further includes:
a structure that, when looking at the vehicle from the front, the left wheel speed sensor is disposed closer to the left brake disc than a center line of the left front inner tube.

12. The vehicle according to claim 1, further comprising:
a right brake including a right brake disc that rotates together with the right front wheel and a right brake caliper that applies a braking force to the right brake disc to apply a braking force to the right front wheel; and
a left brake including a left brake disc that rotates together with the left front wheel and a left brake caliper that applies a braking force to the left brake disc to apply a braking force to the left front wheel; wherein
the condition (A) further includes:
a structure that, when looking at the vehicle from the front, at least a portion of the right sensor wire is disposed closer to the right brake disc than a center line of the right front inner tube; and
the condition (B) further includes:
a structure that, when looking at the vehicle from the front, at least a portion of the left sensor wire is disposed closer to the left brake disc than a center line of the left front inner tube.

13. The vehicle according to claim 1, further comprising:
a right brake including a right brake disc that rotates together with the right front wheel and a right brake caliper that applies a braking force to the right brake disc to apply a braking force to the right front wheel; and
a left brake including a left brake disc that rotates together with the left front wheel and a left brake caliper that applies a braking force to the left brake disc to apply a braking force to the left front wheel; wherein
the condition (A) further includes:
a structure that, when looking at the vehicle from the direction of the right wheel axis, a right wire take-out port is provided on the right sensor housing of the right wheel speed sensor in a position located inwards of an outer edge of the right brake disc; and
a structure that, when looking at the vehicle from the front, at least a portion of the right sensor wire passes through a position located closer to the right brake disc than the right wire take-out port and then extends upwards;
the condition (B) further includes:
a structure that, when looking at the vehicle from the direction of the left wheel axis, a left wire take-out port is provided on the left sensor housing of the left wheel speed sensor in a position located inwards of an outer edge of the left brake disc; and
a structure that, when looking at the vehicle from the front thereof, at least a portion of the left sensor wire passes through a position located closer to the left brake disc than the left wire take-out port and then extends upwards.

14. The vehicle according to claim 1, wherein
the condition (A) further includes:
a structure that, when looking at the vehicle from the front and the vehicle is standing upright and not steered at all, at least a portion of the right wheel speed sensor overlaps the right front inner tube; and
the condition (B) further includes:
a structure that, when looking at the vehicle from the front and the vehicle is standing upright and not steered at all, at least a portion of the left wheel speed sensor overlaps the left front inner tube.

* * * * *